US011763826B2

(12) United States Patent
de la Rey et al.

(10) Patent No.: US 11,763,826 B2
(45) Date of Patent: Sep. 19, 2023

(54) AUDIO SOURCE SEPARATION PROCESSING PIPELINE SYSTEMS AND METHODS

(71) Applicant: WingNut Films Productions Limited, Wellington (NZ)

(72) Inventors: Emile de la Rey, Wellington (NZ); Paris Smaragdis, Urbana, IL (US)

(73) Assignee: Wingnut Films Productions Limited, Wellington (NZ)

( * ) Notice: Subject to any disclaimer, the term of this patent is extended or adjusted under 35 U.S.C. 154(b) by 0 days.

(21) Appl. No.: 17/973,492

(22) Filed: Oct. 25, 2022

(65) Prior Publication Data
US 2023/0131788 A1    Apr. 27, 2023

Related U.S. Application Data

(63) Continuation-in-part of application No. 17/848,341, filed on Jun. 23, 2022.
(Continued)

(51) Int. Cl.
*G10L 19/008*    (2013.01)
*G10H 1/00*    (2006.01)
(Continued)

(52) U.S. Cl.
CPC .............. *G10L 19/008* (2013.01); *G06F 3/16* (2013.01); *G10H 1/0025* (2013.01); *G10L 19/02* (2013.01); *G10H 2210/125* (2013.01)

(58) Field of Classification Search
CPC . G10L 21/0208; G10L 21/02; G10L 21/0216; G10L 15/20; G10L 19/04
(Continued)

(56) References Cited

U.S. PATENT DOCUMENTS 10,014,002 B2    7/2018    Koretzky et al.
10,410,115 B2    9/2019    Lewis et al.
(Continued)

FOREIGN PATENT DOCUMENTS

WO    WO 2020/193929 A1    10/2020
WO    WO 2021/159775 A1    8/2021

OTHER PUBLICATIONS

Ruder, Sebastian et al., "Strong Baselines for Neural Semi-supervised Learning under Domain Shift", arxiv.org, Cornell University Library, 201 Olin Library Cornell University Ithaca, NY 14853, Apr. 25, 2018.
(Continued)

*Primary Examiner* — Alexander Krzystan
(74) *Attorney, Agent, or Firm* — Haynes and Boone, LLP

(57) ABSTRACT

Systems and methods for audio source separation include receiving a single-track audio input sample having an unknown mixture of audio signals generated from a plurality of audio sources, and separating one or more of the audio sources from the single-track audio input sample using a sequential audio source separation model. Separating one or more of the audio sources may include defining a processing recipe comprising a plurality of source separation processes configured to receive an audio input mixture and output one or more separated source signals and a remaining complement signal mixture, and processing the single-track audio input sample in accordance with the processing recipe to generate a plurality of audio stems separated from the unknown mixture of audio signals.

20 Claims, 20 Drawing Sheets

Related U.S. Application Data

(60) Provisional application No. 63/272,650, filed on Oct. 27, 2021.

(51) Int. Cl.
*G10L 19/02* (2013.01)
*G06F 3/16* (2006.01)

(58) Field of Classification Search
USPC ............... 381/71.9, 71.11, 71.12, 71.14, 119
See application file for complete search history.

(56) References Cited

U.S. PATENT DOCUMENTS

| | | | |
|---|---|---|---|
| 2017/0178664 A1 | 6/2017 | Wingate et al. | |
| 2017/0345185 A1* | 11/2017 | Byron | G06F 16/285 |
| 2018/0122403 A1* | 5/2018 | Koretzky | G10L 21/028 |
| 2021/0312939 A1 | 10/2021 | Uhle et al. | |
| 2021/0358513 A1* | 11/2021 | Narisetty | G10L 21/0272 |
| 2022/0095061 A1* | 3/2022 | Diehl | G06N 3/045 |

OTHER PUBLICATIONS

Manilow Ethan et al., "Hierarchical Musical Instrument Separation", Oct. 11, 2020, pp. 376-383. [URL: https://program.ismir2020.net/static/final_papers/105.pdf].

Brunner, Gino et al., "Monaural Music Source Separation using a ResNet Latent Separator Network", 2019 IEEE 31st International Conference on Tools With Artificial Intelligence (ICTAI), IEEE, Nov. 4, 2019.

Wang, Zhepei et al., "Semi-Supervised Singing Voice Separation With Noisy Self-Training", ICASSP 2021—2021 IEEE International Conference on Acoustics, Speech and Signal Processing (ICASSP), IEEE, Jun. 6, 2021 (Jun. 6, 2021), pp. 31-35, XP033954433.

International Search Report dated Jan. 16, 2023, for PCT Application No. PCT/IB2022/060319.

International Search Report dated Jan. 27, 2023, for PCT Application No. PCT/IB2022/060320.

International Search Report dated Jan. 31, 2023, for PCT Application No. PCT/IB2022/060322.

International Search Report dated Jan. 23, 2023, for PCT Application No. PCT/IB2022/060321.

* cited by examiner

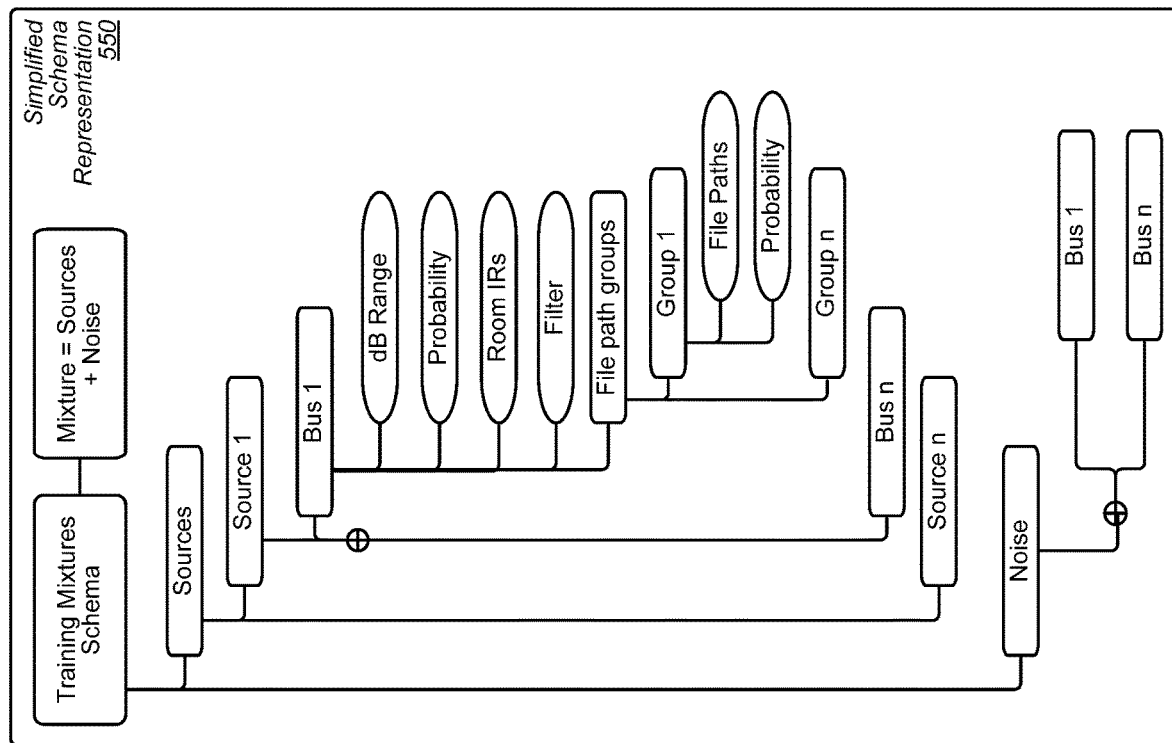
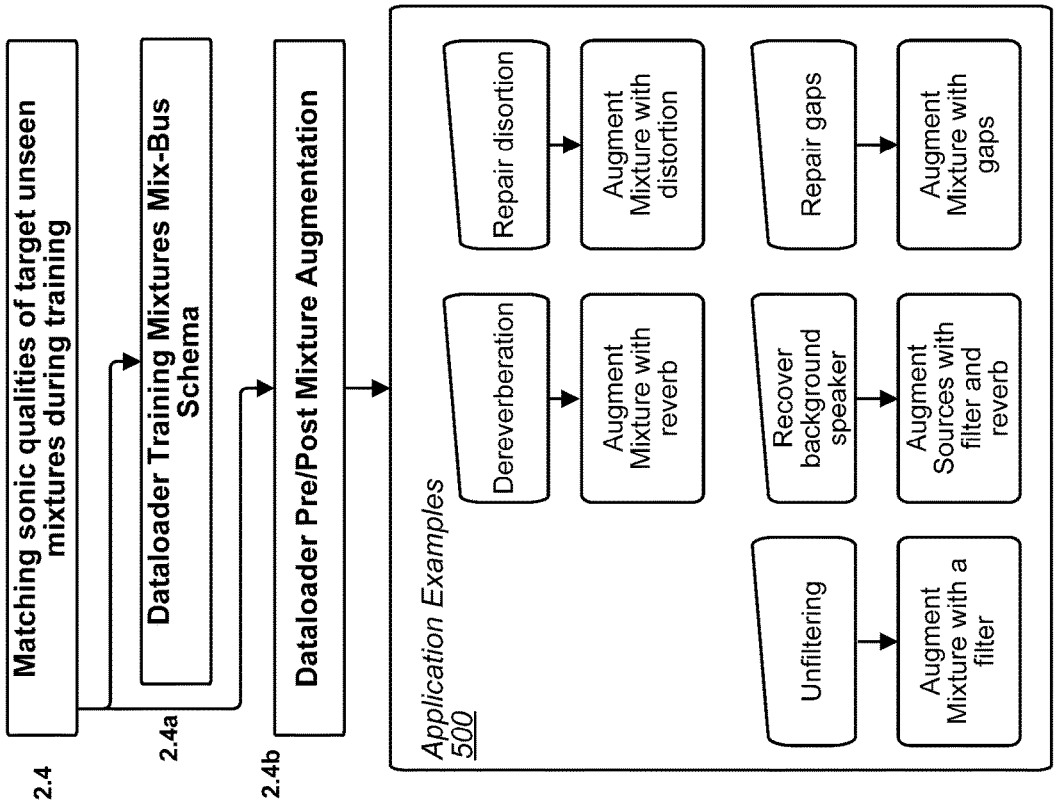
FIG. 5

5.2.4 Combinations of models to separate a particular source class

AUDIO SOURCE SEPARATION PROCESSING PIPELINE SYSTEMS AND METHODS

CROSS-REFERENCE TO RELATED APPLICATIONS

The present disclosure is a continuation-in-part of U.S. patent application Ser. No. 17/848,341, filed Jun. 23, 2022, which claims the benefit of and priority to U.S. Provisional Patent Application No. 63/272,650, filed Oct. 27, 2021, both of which are incorporated by reference herein in their entirety.

FIELD

The present disclosure generally relates to systems and methods for audio source separation and more particularly to systems and methods for separating and enhancing audio source signals from a single-track audio mixture.

BACKGROUND

Audio mixing is the process of combining multiple audio recordings to produce an optimized mixture for playback on one or more desired sound formats, such as mono, stereo or surround sound. In applications that demand high quality sound production, such as sound production for music and films, the audio mixture is commonly produced by mixing separate high-quality recordings. These separate recordings are often generated in a controlled environment, such as a recording studio with optimized acoustics and high-quality recording equipment.

Often, some of the source audio may be low quality and/or include a mixture of desired audio sources and unwanted noise. In modern audio post-production, it is common to re-record audio when the original recordings lack a desired quality. For example, in a music recording a vocal or instrumental track may be recorded and mixed with previous recordings. In sound post-production for films, it is common to bring actors into a studio to re-record their dialogue and add other audio (e.g., sound effects, music) to the mix.

In some applications, however, it is desirable to faithfully transform an original audio source to a high-quality audio mix. For example, films, music, television broadcasts and other audio recordings can date back over 100 years. The source audio may have been recorded on older, low-quality equipment and include a low-quality mixture of desired audio and noise. In many recordings, a single track/mono audio mix is the only audio source available to produce an optimized mixture for playback on modern sound systems.

One approach for processing an audio mixture is to separate the audio mixture into a set of separate audio source components, producing a separate audio stem for each component of the audio mixture. For example, a music recording may be separated into a vocal component, a guitar component, a bass component, and a drum component. Each of the separate components may then be enhanced and mixed to optimize playback.

Existing audio source separation techniques, however, are not optimized to generate the high-quality audio stems needed to produce high fidelity output for the music and film industries. Audio source separation is particularly challenging when the audio source includes low quality, single-track, noisy sound mixtures from older sound recordings.

In view of the foregoing, there is a continued need for improved audio source separation systems and methods, particularly for generation of high-fidelity audio from low quality audio sources.

SUMMARY

Improved audio source separation systems and methods are disclosed herein. In various implementations, a single-track audio recording is provided to an audio source separation system which is configured to separate out various audio components, such as speech and individual musical instruments, into high fidelity stems (e.g., a discrete or grouped collection of audio sources mixed together).

In some implementations, the audio source separation system includes a first machine learning model trained to separate the single-track audio recording into stems, including speech, compliment sounds, and artifacts such as "clicks." Additional machine learning models may then be used to refine the speech stems by removing processing artifacts from the speech and/or fine-tuning the first machine learning model.

In various implementations, a method includes receiving a single-track audio input sample comprising an unknown mixture of audio signals generated from a plurality of audio sources, and separating one or more of the audio sources from the single-track audio input sample using a sequential audio source separation model, including defining a processing recipe comprising a plurality of source separation processes configured to receive an audio input mixture and output one or more separated source signals and a remaining complement signal mixture, and processing the single-track audio input sample in accordance with the processing recipe to generate a plurality of audio stems separated from the unknown mixture of audio signals.

The method may further define the processing recipe by processing the single-track audio input sample using a first processing order of the plurality of source separation processes for separating audio stems to generate a first set of audio stems, processing the single-track audio input sample using a second processing order of the plurality of source separation processes, different than the first processing order, for separating audio stems to generate a second set of audio stems, and evaluating the first set of audio stems and the second set of audio stems to determine which of the first processing order and second processing order to include in the processing recipe.

The processing recipe of the method may further include post-processing the plurality of audio stems to remove and/or mitigate artefacts introduced by the sequential audio source separation model, wherein the post-processing comprises processing the plurality of audio stems through one or more neural networks trained to remove and/or mitigate artefacts comprising clicks, harmonic distortion, ghosting and/or broadband noise.

The processing recipe of the method may further include executing the plurality of source separation processes in a sequential branching processing order wherein a first source separation process is configured to receive the single-track audio input sample and output one or more source separated signals and a remaining complement signal mixture, and each subsequent separation process is configured to receive an output signal from a previous source separation process, and wherein each node of the processing recipe is configured to separate a particular source class from an input audio mixture.

The processing recipe of the method may further include post-processing the plurality of audio stems by combining two of more of the plurality of audio stems having a common source class that were generated by different source separation processes in the processing recipe, and/or processing one or more of the plurality of audio stems to mitigate artefacts and/or noise introduced by the sequential audio source separation model by applying neural network models trained to clean artefacts on separated audio stems in accordance with the processing recipe.

The at least one source separation process of the method may further include separating and outputting a mixture of speech sources and a remaining complement comprising music and noise.

The method may further include evaluating output audio stems from a plurality of sequential branching processing orders to assess optimize processing order, wherein evaluating comprises processing an input mixture to separate a first source class and a first remaining complement and then processing the first remaining complement to separate a second source class to generate a first set of audio output stems, wherein evaluating further comprises processing the input mixture to separate the second source class and a second remaining complement and then processing the second remaining complement to separate the first source class to generate a second set of audio output stems. The method may further include comparing the first set of audio output stems and the second set of audio output stems and to determine a processing order that generates higher quality audio output stems.

Separating one or more of the audio sources from the single-track audio input sample using a sequential audio source separation model of the method may further include a user-guided and/or self-iterative process configured to progressively separate sources from the unknown mixture of audio signals, by selecting audio augmentations and/or audio augmentation parameters to fine-tune the sequential audio source separation model to enable matching source signals in the unknown mixture of audio signals, and identifying source classes in the unknown mixture of audio signals to identify general separation models for use in the processing recipe.

The processing recipe of the recipe may further comprise a set of source classes and output stems and corresponding source separation models arranged in a hierarchical branching sequence, wherein at least one class of sources is separated into a plurality of source class separated stems, and/or wherein the processing recipe comprises generating a mixture of the plurality of source class separated stems as a source class output.

The method may further include training the sequential audio source separation model using the single-track audio input sample by providing the single-track audio input sample to a general source separation model to generate a plurality of initial audio stems corresponding to one or more of the plurality of audio sources and re-training the general source separation model using, at least in part, one or more of the plurality of initial audio stems, and wherein the general source separation model comprises a plurality of neural network models, each neural network model configured to receive a single channel audio input sample and output one or more source separated audio stems comprising a source class and a remaining complement signal mixture.

Training the sequential audio source separation model of the method may further include training the plurality of neural network models in an order defined by the processing recipe, and/or wherein the processing recipe comprises a hierarchical branching sequence wherein each branch comprises one or more of the plurality of neural network models. Training the sequential audio source separation model of the method may further include reiteratively training the sequential audio source separation model, based at least in part, on the plurality of audio stems generated from a previous iteration of the sequential audio source separation model, evaluating the one or more of the plurality of audio stems by determining metrics associated with the source separated audio stems and comparing the metrics to one or more threshold parameters, and/or adding one or more source separated audio stems to a training dataset for training the sequential audio source separation model based on the evaluating.

Training may further include generating a training dataset of artefacts generated by the processing recipe for training one or more neural networks to receive source separated outputs with artefacts and generate an enhanced output with one or more artefacts mitigated and/or removed in accordance with the processing recipe.

In various implementations, a system includes a memory component storing machine-readable instructions, and a logic device configured to execute the machine-executable instructions to separate one or more audio sources from a single-track audio input sample comprising an unknown mixture of audio signals generated from a plurality of audio sources using a sequential audio source separation model, by defining a processing recipe comprising a plurality of source separation processes configured to receive an audio input mixture and output one or more separated source signals and a remaining complement signal mixture, and processing the single-track audio input sample in accordance with the processing recipe to generate a plurality of audio stems separated from the unknown mixture of audio signals.

The logic device may be further configured to define the processing recipe by processing the single-track audio input sample using a first processing order of the plurality of source separation processes for separating audio stems to generate a first set of audio stems, processing the single-track audio input sample using a second processing order of the plurality of source separation processes, different than the first processing order, for separating audio stems to generate a second set of audio stems, and evaluating the first set of audio stems and the second set of audio stems to determine which of the first processing order and second processing order to include in the processing recipe.

The logic device may be further configured to define a processing recipe by post-processing the plurality of audio stems to remove and/or mitigate artefacts introduced by the sequential audio source separation model, and wherein the post-processing comprises processing the plurality of audio stems through one or more neural networks trained to remove and/or mitigate artefacts comprising clicks, harmonic distortion, ghosting and/or broadband noise.

The system may be further defined in that at least one source separation process include separating and outputting a mixture of speech sources and a remaining complement comprising music and noise.

The logic device of the system may be further configured to define the processing by executing the plurality of source separation processes in a sequential branching processing order wherein a first source separation process is configured to receive the single-track audio input sample and output one or more source separated signals and a remaining complement signal mixture, and each subsequent separation process is configured to receive an output signal from a previous source separation process, and wherein each node of the processing recipe is configured to separate a particular source class from an input audio mixture.

The logic device may be further configured to evaluate output audio stems from a plurality of sequential branching processing orders to assess optimize processing order by processing an input mixture to separate a first source class and a first remaining complement and then processing the first remaining complement to separate a second source class to generate a first set of audio output stems, processing the input mixture to separate the second source class and a second remaining complement and then processing the second remaining complement to separate the first source class to generate a second set of audio output stems, and comparing the first set of audio output stems and the second set of audio output stems and to determine a processing order that generates higher quality audio output stems.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the methods, as defined in the claims, is provided in the following written description of various implementations of the disclosure and illustrated in the accompanying drawings.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating implementations of the present disclosure and not for purposes of limiting the same. The components in the drawings are not necessarily to scale, emphasis instead being placed upon clearly illustrating the principles of the present disclosure.

FIG. 5 illustrates an example operation of a dataloader for use in training a machine learning system, in accordance with one or more implementations.

DETAILED DESCRIPTION

Figure 1:
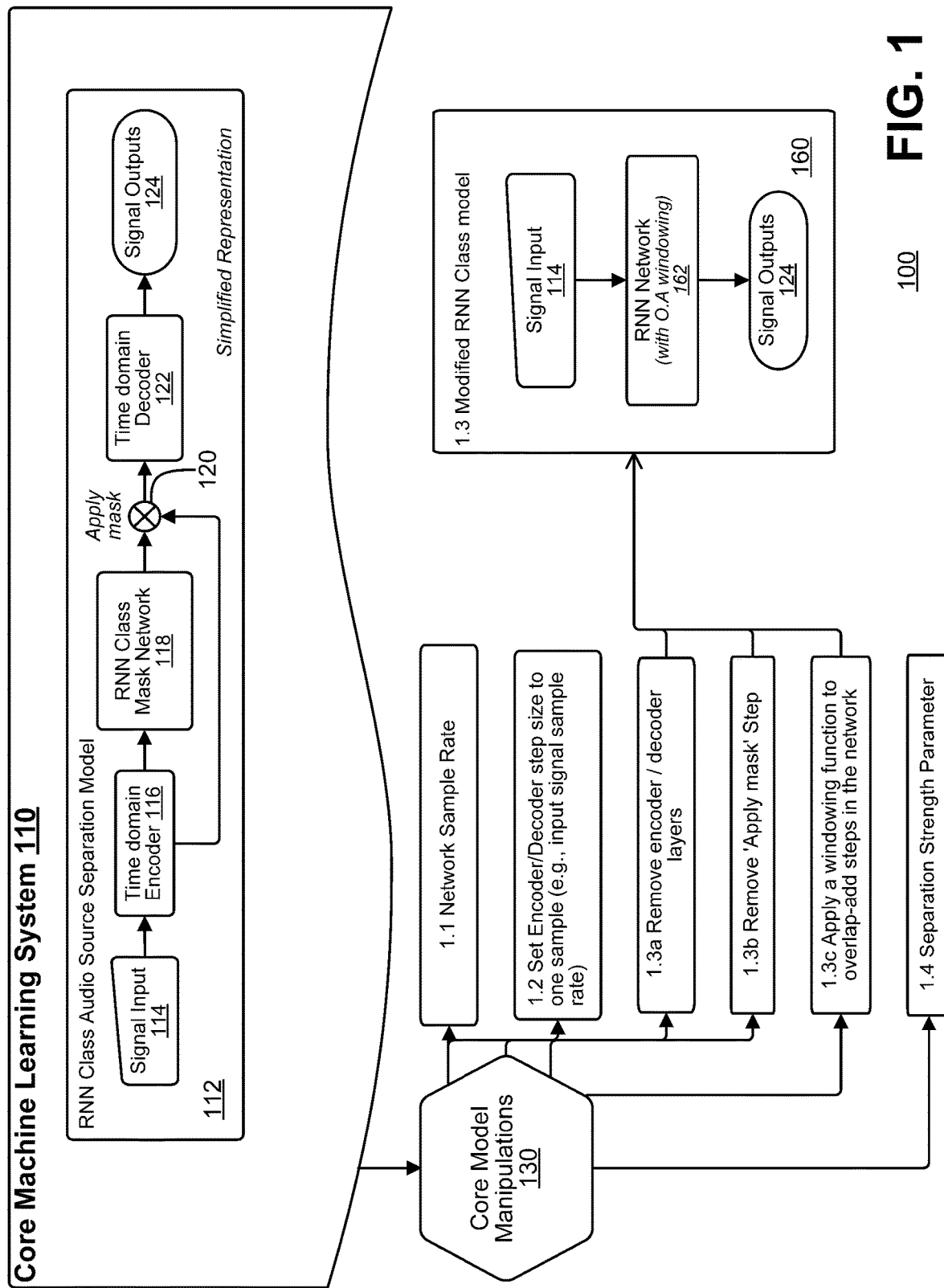
FIG. 1 illustrates an audio source separation system and process, in accordance with one or more implementations.

In the following description, various implementations will be described. For purposes of explanation, specific configurations and details are set forth in order to provide a thorough understanding of the implementations. However, it will also be apparent to one skilled in the art that the implementations may be practiced without the specific details. Furthermore, well-known features may be omitted or simplified in order to avoid obscuring the implementation being described.

Improved audio source separation systems and methods are disclosed herein. In various implementations, a single-track (e.g., undifferentiated) audio recording is provided to an audio source separation system configured to separate out various audio components, such as speech and musical instruments, into high fidelity stems—a discrete or grouped collection of audio sources mixed together. In various implementations, the single-track audio recording contains an unseen audio mixture (e.g., the audio sources, recording environment, and/or other aspects of the audio mixture are unknown to the audio source separation system) and the audio source separation systems and methods adapt to identify and/or separate the audio sources from the unseen audio mixture in a self-iterative training and fine-tuning process.

The systems and methods disclosed herein may be implemented on at least one computer-readable medium carrying instructions that, when executed by at least one processor causes the at least one processor to perform any of the method steps disclosed herein. Some implementations relate to a computer system including at least one processor and a memory storing instructions that, when executed by the at least one processor, cause the at least one processor to perform any method steps disclosed herein. In various implementations, models described herein may be implemented as stored data and software modules and/or code acting on the stored data.

In some instances, training a model involves processing some data structure or structures to form a new data structure that components of a computer system can access and use as a model. For example, an artificial intelligence system may comprise a computer comprising one or more processors, program code memory, writable data memory, and some inputs/outputs. The writable data memory may hold some data structures that correspond to a trained or untrained model. Such data structure might represent one or more layers of nodes of a neural network and links between nodes of different layers as well as weights for at least some of the links between nodes. In other instances, different types of data structures might represent a model.

In some cases, when referring to training a model, feeding a model, and/or having a model take inputs and provide outputs, this may refer to actions of the computer that is able to read the writable data memory that contains the model and executes program code for working with the model. For example, a model may be trained on a collection of training data, which may be training examples themselves and/or training examples and corresponding ground truths. Once trained, a model may be usable to make a decision about an example that is provided to the model. This may be done by the computer receiving, at an input, input data representing an example, performing processes with the example and the model, and outputting output data, at an output, representing and/or indicating a decision that is made by or based on the model.

In a very specific example, an artificial intelligence system may have a processor that reads in a large number of pictures of cars and reads in ground truth data indicating "These are cars." The processor may read in a large number of pictures of lampposts and the like and read in ground truth data indicating "These are not cars." In some instances, the model is trained on input data itself without being provided with ground truth data. A result of such processing can be a trained model. The artificial intelligence system can then, with the model having been trained, be provided with an image with no indication of whether it is an image of a car or not, and can output an indication of a decision of whether it is an image of a car or not.

For processing audio signals, data, recordings, etc., the inputs can be the audio data itself, and some ground truth data about the audio data, or not. Then, once trained, an artificial intelligence system may receive some unknown audio data and output decision data about that unknown audio data. For example, the output decision data may relate to extracted sounds, stems, frequencies, etc. or other decisions or AI-determined observations of the input audio data.

A resulting data structure corresponding to the trained model might then be ported or distributed to other computer systems, which can then use the trained model. Once trained, the computer code in the program memory, when run by the processor, can receive an image at an input and, based on the fact that the data structure represents a trained AI model that has been trained, the program code can process the input and output a decision as to the nature of the input. In some implementations, an AI model may comprise data structures and program code that are intertwined and not easily separated.

A model may be represented by a set of weights assigned to edges in a neural network graph, program code and data that includes the neural network graph and instructions on how to interact with the graph, a mathematical expression, such as a regression model or a classification model, and/or other data structure as may be known in the art. A neural model (or neural network, or neural network model) can be embodied as a data structure indicating or representing a set of connected nodes, often referred to as neurons, many of which might be data structures that imitate of simulate the signal processing performed by a biological neuron. Training might include updating parameters associated with each neuron, such as which other neurons it is connected to and the weights and/or function of the neuron's inputs and outputs. In effect, the neural model can pass and process input data variables in a certain way to generate output variables to achieve a certain purpose, e.g., to generate a binary classification whether an input image or an input dataset fits a category or not. A training process may entail complex computations (e.g., computing gradient updates, and then using the gradients to update parameters layer-by-layer). The training may be done with some parallel processing.

Any of the models for audio source separation described herein may also be referred to at least in part by a number of terms including "audio source separation model", "recurrent neural network", "RNN", "deep neural network", "DNN", "inference model", or "neural network", for example.

Figure 2:
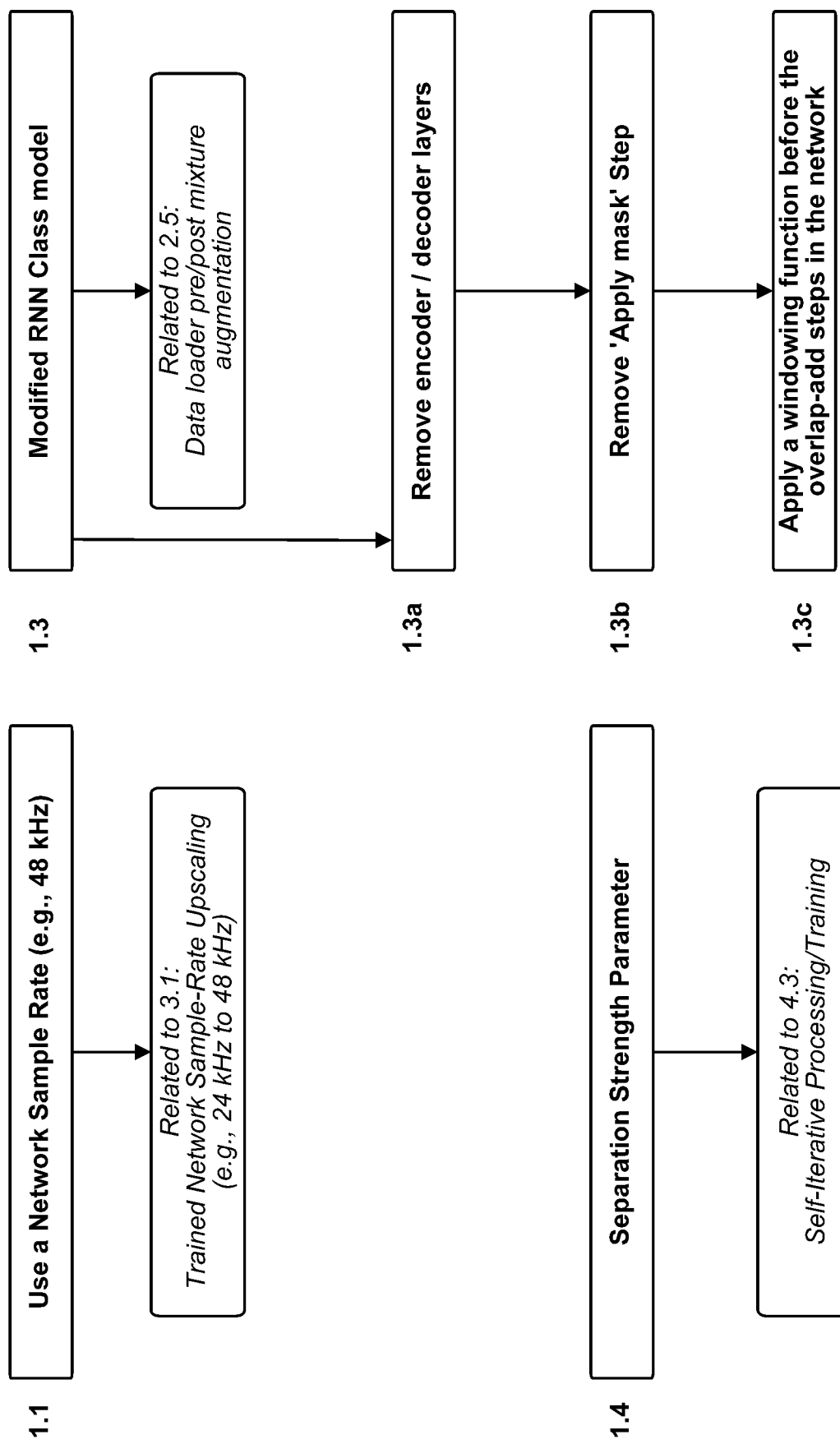
FIG. 2 illustrates elements relating to the system and process of FIG. 1, in accordance with one or more implementations.

FIGS. 1 and 2 illustrate an audio source separation system and process, in accordance with one or more implementations of the present disclosure. An audio processing system 100 includes a core machine learning system 110, core model manipulations 130, and a modified recurrent neural network (RNN) class model 160. In the illustrated implementation, the core machine learning system 110 implements an RNN class audio source separation model (RNN-CASSM) 112, which is depicted in a simplified representation in FIG. 1. As illustrated, the RNN-CASSM 112 receives a signal input 114, which is input to a time-domain encoder 116. The signal input 114 includes a single-channel audio mixture, which may be received from a stored audio file accessed by the RNN-CASSM network, an audio input stream received from a separate system component, or other audio data source. The time-domain encoder 116 models the input audio signal in the time-domain and estimates the audio mixture weights. In some implementations, the time-domain encoder 116 segments the audio signal input into separate waveform segments which are normalized for input to a 1-D convolutional coder. The RNN class mask network 118 is configured to estimate source masks for separating the audio sources from the audio input mix. The masks are applied to the audio segment by source separation component 120. The time-domain decoder 122 is configured to reconstruct the audio sources which are then available for output through signal outputs 124.

In an example implementation, the RNN-CASSM 112 is modified for operation in accordance with core model manipulations 130, which will now be described. Referring to block 1.1, the audio source data is sampled using a 48 kHz sample rate in various implementations. Therefore, the RNN-CASSM 112 may be trained at a higher than audible frequency to recognize separate stems of audio in the lower frequency range. It is observed that implementations of speech separation models trained at sample-rates lower than 48 kHz produce lower quality audio separations in audio samples recorded with older equipment (e.g., 1960s era Nagra(tm) equipment). The various steps disclosed herein are performed at the 48 kHz sample rate, such as training a source separation model, setting appropriate hyperparameters for that sample rate, and operating a signal processing pipeline at the 48 kHz sample rate. Other sampling rates including oversampling may be used in other implementations, consistent with the teachings of the present disclosure. In block 1.2, the encoder/decoder framework (e.g., time-domain encoder 116 and time-domain decoder 122) is set to a step size of one sample (e.g., the input signal sample rate).

Referring to block 1.3, a modified RNN-CASSM 160 is generated that extends beyond source separation and noise reduction of a traditional implementation. It is observed that processing audio mixtures with a trained RNN-CASSM can sometimes yield undesirable click artefacts, harmonic artefacts, and broadband noise artefacts. To solve this, the audio processing system 100 applies modifications to the RNN-CASSM network 112 as referenced in blocks 1.3a, 1.3b, and/or 1.3c to reduce and/or avoid artefacts and provide other advantages. The same modifications may also be used for more transformative types of learned processing as well.

The model manipulations associated with the modified RNN-CASSM 160 will now be described in further detail with reference to blocks 1.3a-c. In block 1.3a, at least some of the encoder and decoder layers are removed and not used in the modified RNN-CASSM. It is observed that these removed layers may be redundant in learned filters when the step size is one sample. In block 1.3b, the apply mask step (e.g., component 120) is also removed for at least some portion of the audio processing. Therefore, the modified RNN-CASSM 160 may perform audio source separation without applying a mask. The masking step potentially contributes to clicking artefacts often present in the generated audio stems. To address this, an audio processing system may omit some or all of the masking and instead use an output of a RNN class mask network 118 in a more direct manner (e.g., train the RNN to output one or more separated audio sources). In block 1.3c, a windowing function is applied to the overlap-add steps of the RNN class mask network (e.g., RNN network 162). When a model output has linear harmonic series "banding" artefacts at frequencies that are related to an overlap-add function segment length, the audio processing system can deploy a windowing function across each overlapping segment to smooth hard edges when reconstructing the audio signal.

Referring to block 1.4, another core model manipulation 130 is the use of a separation strength parameter, which allows control over the intensity of the separation mask that is applied to the input signal to produce the separated source. To provide for direct control over intensity of a separation mask that is applied to the input signal(s) to produce separated source(s), a parameter is introduced during the forward pass of the model that determines how strongly the separation mask is applied. In one example, a separation strength parameter may be represented as a function applied to a separation mask in a mask-type source separation model, such as $f(M)=M^S$, where mask M has values [0,1] and s is the separation strength parameter. In this example, values where s>1.0 yield lower mask values and less of the target source when the mask is applied to the input mixture, and values where s<1.0 yield higher mask values and a combination of the target source and the complements and noise components in the signal.

The separation strength parameter may be implemented as a helper function of an automated version of a self-iterative processing training (SIPT) algorithm, which will be described in further detail below. It will be appreciated that the RNN-CASSM 112 may implement one or more of the core model manipulations 130 disclosed herein and may include additional manipulations consistent with the teachings of the present disclosure.

Figure 3:
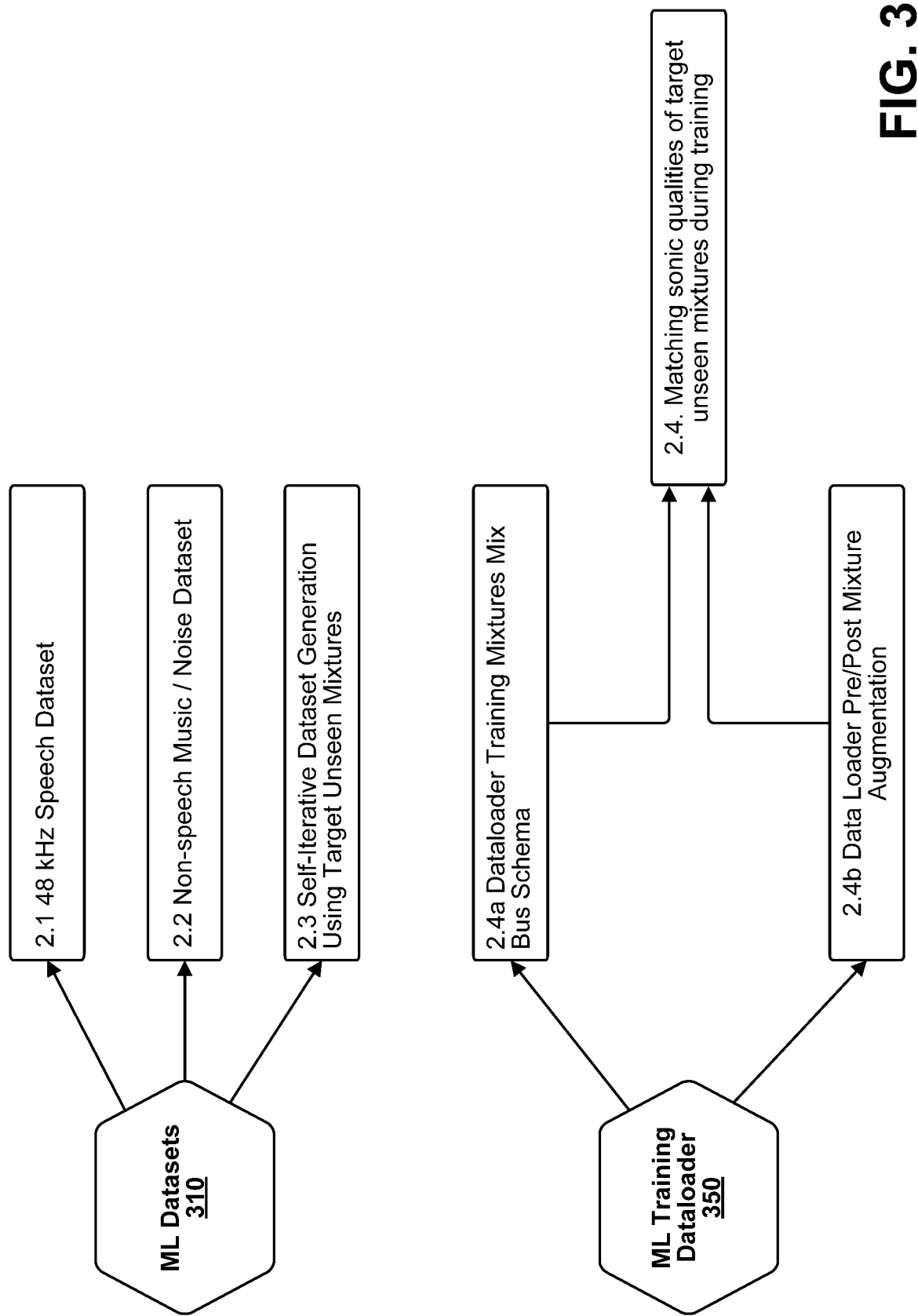
FIG. 3 is a diagram illustrating machine learning datasets and a training dataloader, in accordance with one or more implementations.
Figure 4:
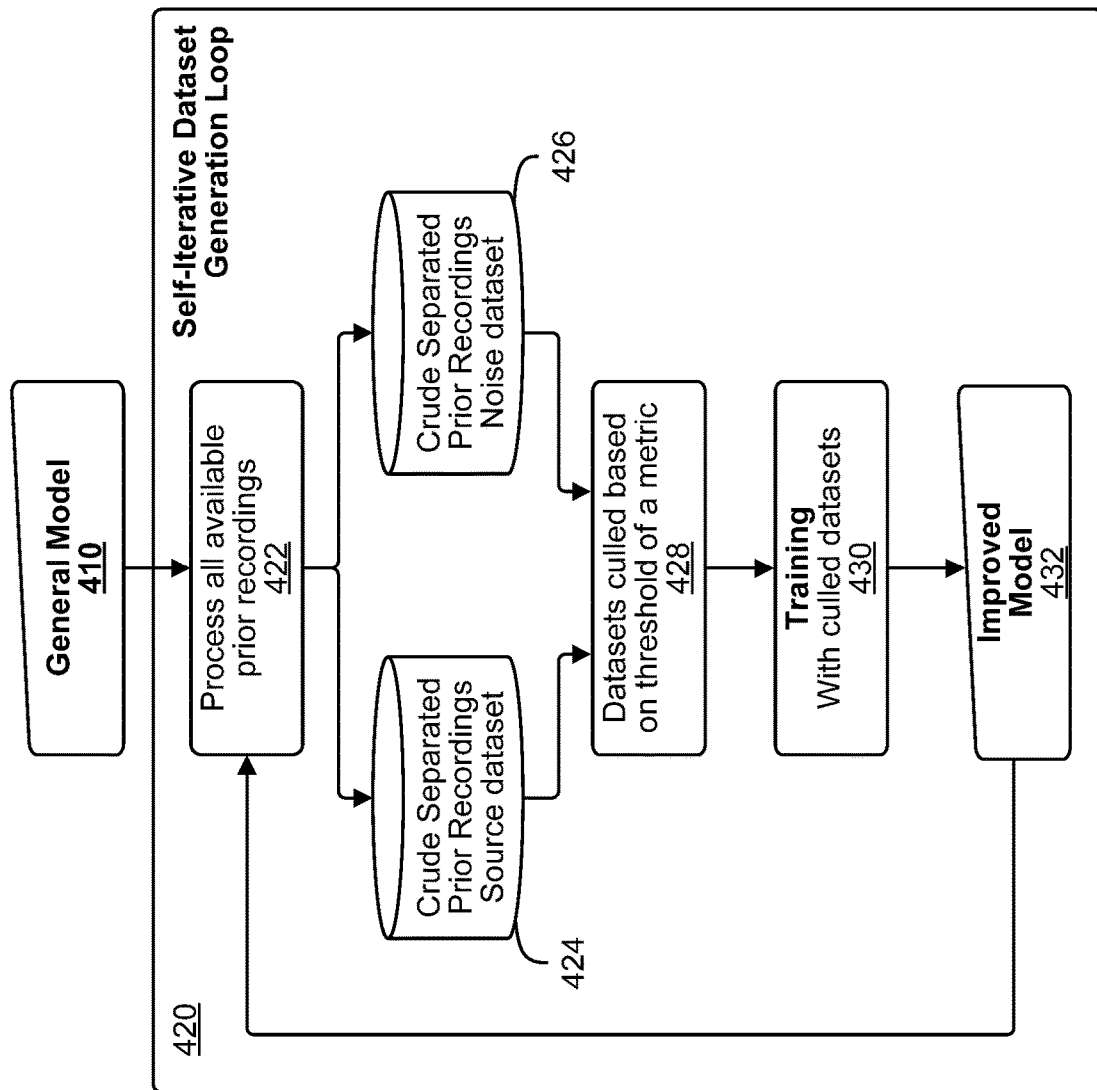
FIG. 4 illustrates an example machine learning training system including a self-iterative dataset generation loop, in accordance with one or more implementations.

Referring to FIGS. 3-5, example processes for training the RNN-CASSM network for audio source separation will now be described. The training process includes a plurality of labeled machine learning training datasets 310 configured to train the network for audio source separation as described herein. For example, in some implementations the training dataset may include audio mixes and a ground truth label identifying a source class to be separated from the audio mix. In other implementations, the training dataset may include separated audio stems having audio artefacts (e.g., clicks) generated by the source separation process and/or one or more audio augmentations (e.g., reverb, filters) and a ground truth label identifying an enhanced audio stem with the identified audio artefact(s) and/or augmentations removed.

In operation, the network is trained by feeding labeled audio samples to the network. In various implementations, the network includes a plurality of neural network models that may be separately trained for a particular source separation task (e.g., separate speech, separate foreground speech, separate drums, remove artefacts, etc.). The training includes a forward pass through the network to produce audio source separation data. Each audio sample is labeled with a "ground truth" defining the expected output, which is compared to the generated audio source separation data. If the network mislabels the input audio sample, then a backward pass through the network may be used to adjust parameters of the network to correct for the misclassification. In various implementations, the output estimate, denoted as $\hat{Y}$, is compared to the ground truth, denoted as Y, using regression losses such as an L1 loss function (e.g., least absolute deviations), an L2 loss function (e.g., least squares), a scale-invariant signal-to-distortion ratio (SISDR), scale dependent signal-to-distortion ratio (SDSDR), and/or other loss functions as known in the art. After the network is trained, a validation dataset (e.g., a set of labeled audio samples not used in the training process) may then be used to measure the accuracy of the trained network. The trained RNN-CASSM network may then be implemented in a run time environment to generate separate audio source signals from an audio input stream. The generated separate audio source signals may also be referred to as a generated plurality of audio stems. The generated plurality of audio stems may correspond to one or more audio source of the plurality of audio sources of the audio input stream.

In various implementations, the modified RNN-CASSM network 160 is trained based on a plurality (e.g., thousands) of audio samples including audio samples representing a plurality of speakers, musical instruments, and other audio source information under a variety of conditions (e.g., including various noisy conditions and audio mixes). From the error between separated audio source signals and the labeled ground truth associated with the audio samples from the training dataset, the deep-learning model learns parameters that allow the model to separate audio source signals. RNN-CASM 120 and modified RNN-CASM 160 may also be referred to as an inference model 120 and modified inference model 160, and/or trained audio separation model 120 and updated audio separation model 160.

FIG. 3 is a diagram of machine learning datasets 310 and a training dataloader 350 as may relate to datasets and dataset manipulations during training by an audio processor that can provide improvements and/or useful functionality in output signal quality source separation. In the illustrated implementation, the RNN-CASSM network is trained to separate audio sources from a single-track recording of a music recording session including a mixture of people singing/speaking, musical instruments being played, and various environmental noises.

Referring to block 2.1, the training dataset used in the illustrated implementation includes a 48 kHz speech dataset. For example, the 48 kHz speech dataset may include the same speech recorded simultaneously at various microphone distances (e.g., close microphone and more distant microphone). In one test implementation, 85 different speakers were included in the 48 kHz speech dataset with over 20 minutes of speech for each speaker. In various implementations, an example speech dataset may be created using a large number of speakers, such as 10, 50, 85, or more, from adult male and female speakers, for an extended speaking period, such as 10 minutes, 20 minutes, or more, and recording at 48 kHz or higher sampling rates. It will be appreciated that other dataset parameters may be used to generate the training dataset in accordance with the teachings of the present disclosure.

Referring to block 2.2, the training dataset further includes a non-speech music and noise dataset, including sections of input audio, such as digitized mono audio recording originally recorded on analog media. In some implementations, this dataset may include sections of recorded music, non-vocal sounds, background noise, audio media artefacts from digitized audio recordings, and other audio data. Using this dataset, the audio processing system can more easily separate voices of speakers of interest from other voices, music, and background noise in digitized recordings. In some implementations, this may include use of manually collected segments of the recording that are manually noted as lacking speech or another audio source class and labeling those segments accordingly.

Referring to block 2.3, the dataset is generated and modified using a gradual self-iterative dataset generation process using target unseen mixtures (e.g., a mixture unknown to the audio processing system). The generated dataset may include a labeled dataset generated by processing an unlabeled dataset (e.g., the target unseen mixture to be source separated) through one or more neural network models to generate an initial classification. This "crudely-separated data" is then processed through a cleanup step configured to select among the "crudely-separated data" to keep the most useful "crudely-separated data" based on a utility metric. For example, the performance of a training dataset may be measured by applying the validation dataset to models trained using various training datasets including the "crudely-separated data" to determine the data samples that contribute to better performance and the data samples that contribute to poor performance based on a calculated validation error. The utility metric may be implemented as a function that estimates a quality metric in the crudely-separated data in order to identify "low quality" fine-tuning data to be discarded before the next fine-tuning iteration. For example, a moving root mean square (RMS) window function may be calculated on the outputs of a network to identify the sections of an output where the RMS metric lies above a calibrated threshold for a certain (or minimum) duration of samples. This metric can be used, for example, to identify low amplitude sections of a crudely separated source output where artefacts are more likely to occur. The threshold and minimum duration may be user-adjustable parameters allowing tuning of the data to be discarded.

The gradual self-iterative dataset generated using target unseen mixtures may be generated using the self-iterative dataset generation loop 420 as illustrated in FIG. 4. In various implementations, prior recordings containing sources to be separated, which are yet unseen by a trained source separation model, are less likely to be successfully separated by the model. Existing datasets may not be substantial enough to train a robust separation model for the targeted sources and the opportunity to capture new recordings of the sources may not exist. In lieu of capturing new recordings of the sources, additional training data may be manually labeled from isolated instances of the sources in prior recordings. For example, isolated speech from an identified speaker, isolated audio of an identified musical instrument recorded on similar equipment in a similar environment, and/or other available audio segments that approximate the sources being separated may be added manually and/or automatically (e.g., based on meta data labeling of the audio source, such as an identification of the source, source class, and/or environment) to the training data. This additional training data may be used to help fine-tune train a model to improve processing performance on the prior recordings. However, this labeling process may involve a considerable amount of time and manual labor, and there may not exist enough isolated instances of the sources in the prior recordings to yield a sufficient amount of additional training data.

The illustrated generation refinement tool can overcome these difficulties. In one method a crude, general model 410 is trained on a general training dataset. General training dataset may comprise labeled source audio data and labeled noise audio data. General model 410 may be referred to as a general source separation model 410 or trained audio source separation model 410. The training dataset may comprise a plurality of datasets, each of the plurality of datasets comprising labeled audio samples configured to train the system to address a source separation problem. The plurality of datasets may comprise a speech training dataset comprising a plurality of labeled speech samples, and/or a non-speech training dataset comprising a plurality of labeled music and/or noise data samples. Available prior recordings, including the unseen audio mixture to be separated, are then processed with the general model in process 422, yielding two labeled datasets of isolated audio (e.g., audio stems)—crude separated prior recordings source dataset 424 and crude separated prior recordings noise dataset 426.

In various implementations, other training datasets may be used that provide a collection of labeled audio samples that are chosen to train the system to solve a particular problem (e.g., speech vs. non-speech). In some implementations, for example, the trained dataset may include (i) music vs. sound effects vs. foley, (ii) datasets for various instruments of a band, (iii) multiple human speakers separated from each other, (iv) sources from room reverberation, and/or (v) other training datasets. Next, the results are culled (process 428) using a threshold metric, stripping away audio windows below a chosen root mean square (RMS) level, which can be user selectable. In some implementations, a moving RMS may be calculated by segmenting the audio data into equal duration overlapping windows, and calculating the RMS for each window. The RMS level may be referred to as a utility metric or quality metric and the RMS level may be one option of alternative utility metrics or quality metrics. The quality metric may be calculated based on the associated plurality of audio stems.

Next, a new model is trained using the culled self-iterative dataset (e.g., the culled results added to the audio training dataset, the culled self-iterative dataset also referred to as the culled dynamically evolving dataset) in process 430 to trained and generate an improved model 432 to improve its performance when processing recordings. The improved model 432 may be configured to re-process the audio input stream to generate a plurality of enhanced audio stems. This improved model is an update of the trained audio source separation model. This improved model may be referred to as an updated audio source separation model 432.

In some implementations, the audio training dataset may be curated during the iterative fine-tuning process to remove data that is not relevant to the target input mixture. For example, the input mixture may identify/classify various sources in the input mixture, leaving certain other source categories that have not be identified/classified and/or are not otherwise relevant to the source separation task. Training data associated with these "irrelevant" source categories (e.g., categories not found in the target mixture, categories identified as irrelevant to the source separation task by a user, and/or other irrelevant source categories as defined by other criteria) may be culled from the audio training dataset allowing the training dataset to become increasingly specific to the content of the target input mixture.

This process 420 can be repeated iteratively, each improving the model's separation quality (e.g., fine tuning to improve the accuracy and/or quality of the source separation). Upon subsequent reiteration, process 420 may use a further RMS level, whereby the further RMS level is greater than the prior RMS level. This process allows a more automated refinement of the initial general source isolation or separation model. It has been observed that looping at various stages showed improvements over larger relevant mixtures. General model 410 and improved model 432 may also be referred to as an inference model 410 and modified inference model 432, and/or trained audio separation model 410 and updated audio separation model 432.

Improvement of the separation quality (e.g., audio fidelity) can be measured by the system and/or evaluated by the user providing feedback to the system through a user interface and/or supervising one or more of the steps in the process 420. In some implementations, the process 420 may use a combination of algorithms and/or user evaluation to calculate a Mean Opinion Score (MOS) to estimate separation quality. For example, an algorithm can estimate the amount of artefacting generated during a source separation operation, which in turn relates to the overall quality of a network's output. In some implementations, an estimate the amount of artefacting generated during a source separation operation, includes feeding the separated sources through a neural networking model trained to separate audio artefacts from a signal, enabling the measurement of the presence and/or intensity of such audio artefacts. The intensity of the audio artefacts can be determined in each iteration and tracked between iterations to fine tune the model. In some implementations, the iterative process continues until the estimated separation quality across iterations stops improving and/or the estimated separation quality satisfies one or more predetermined quality thresholds.

Referring to blocks 2.4 and 2.4a, the machine learning training dataloader 350 is configured to match sonic qualities (e.g., perceived distance from microphone, filtering, reverberation, echoes, non-linear distortion, spectral distribution, and/or other measurable audio qualities) of target unseen mixtures during training. A challenge with training an effective supervised source separation model is that the dataset examples ideally need to be curated to match the qualities of the sources in the target mixtures as closely as possible. For example, if a speaker is to be isolated from a mixture where they are speaking into a microphone in a reverberant auditorium, and the recording was captured from some distance on a recording device in the audience, a comparison may be made to how the same speaker may sound when recorded speaking directly into a microphone in a neutral non-reverberant space such as where a high-quality speech dataset may have been recorded. The goal then becomes to add augmentation to the high-quality speech dataset samples during training that generally yields lower divergence from the target input mixtures. In this example, a "reverberation" augmentation may be added to simulate that of the auditorium, a "non-linear distortion" augmentation to simulate the speaker's voice amplified by a sound system, and a "filter" augmentation to simulate distance of the sound system from the recording device.

In various implementations, a solution includes a hierarchical mix bus schema including pre and post mixture augmentation modules. Creating ideal target mixtures would be tedious or impractical to craft manually every time a new style of mixture is required for training. The hierarchical mix bus schema allows easy definition of arbitrarily complex randomized "Sources" and the "Noise" during supervised source separation training. The dataloader approximately matches qualities such as filtering, reverberation, relative signal levels training, and other audio qualities for improved source separation enhancement results. The machine learning dataloader uses a hierarchical schema that allows for easy definition of the "Sources" and "Noise" mixtures that are dynamically generated from source data while training the model. Mix busses allow optional augmentations such as reverbs, or filters with accompanying randomization parameters. With appropriately classified dataset media as raw material this allows easy setup of training datasets that mimic the desired source separation target mixtures.

An example simplified schema representation 550 is illustrated in FIG. 5. The training mixtures schema includes separate options for sources and noise and includes criteria such as dB range, probability associated with the source determination, room impulse response, filter(s), and other criteria.

Referring to block 2.4b, the dataloader further provides pre/post mixture augmentation, including filters, non-linear functions, convolutions applied to the target mixture during training. In various implementations, relevant augmentations are identified and added to the training dataset, and the separated audio stems are post-processed (e.g., using the pipelines described herein). The source separation model can be trained with the additional goal of transforming the separated source using augmentations. In some implementations the system can be trained to isolate the source exactly as it may sound in the input mixture. In some implementations, the system may be further trained to improve upon some qualities of the separated source by applying appropriate augmentations, for example, augmentations that result in the least divergence from the target mixture when using the available training datasets. The divergence and appropriate augmentations may be estimated algorithmically and/or by evaluation by the user. For example, a voice in an input mixture may be filtered and difficult to understand due to being recorded behind a closed door. In this example the separated source may be augmented (e.g., deteriorate the input voice dataset to generally match the sound of a voice behind a closed door). However, the target separated source output during training would not be augmented in this example (e.g., augmented voice input vs corresponding high-quality voice target output dataset during training), so the network is trained to approximate this same transformation by post-processing augmentation.

In some implementations, the target source may be a transformed version of its current representation in the mixture. For example, there may be a need to restore a bandwidth limited recording to a fuller frequency spectrum, or isolate and increase proximity fidelity of an obscured background speaker. These needs may be a user decision or left to a transformative model itself to resolve automatically based on input divergence from target output training set. For example, if a model has been trained to output high-quality close proximity speech without much reverberation when using randomly augmented speech datasets during training, then inputting mixtures containing such high-quality close proximity speech without much reverberation may tend to result in minimal changes to those inputs. However, inputting mixtures containing speech that diverges from these qualities may tend to transform those input speech mixtures to resemble high-quality close proximity speech without much reverberation.

Augmentation modules can be used by the dataloader to generate training examples consisting of an augmented source as the input alongside an alternatively augmented version of the same source as the target output. This allows transformative examples where a target source may be represented in an alternatively augmented context when part of the training mixture. When used while training the modified RNN-CASSM this enables the audio processing system to learn operations such as "unfiltering", "dereverberation" and deeper recovery of heavily obscured target sources.

Application examples 500 in the illustrated implementation include: (i) unfiltering, which includes augmenting the mixtures with a filter, (ii) dereverberation, which includes augmenting the mixture with reverb, (iii) recover background speaker, which includes augmenting the sources with a filter and reverb, (iv) repairing distortion, which includes augmenting the mixture with distortion, and (v) repair gaps, which includes augmenting the mixture with gaps.

Figure 6:
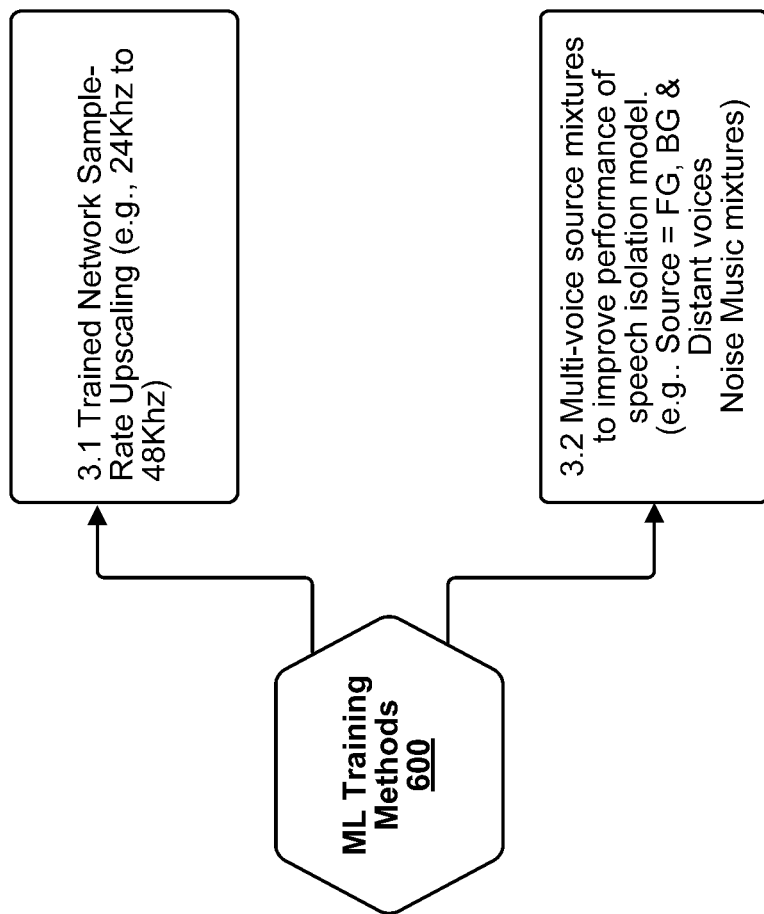
FIG. 6 illustrates example machine learning training methods, in accordance with one or more implementations.
Figure 7:
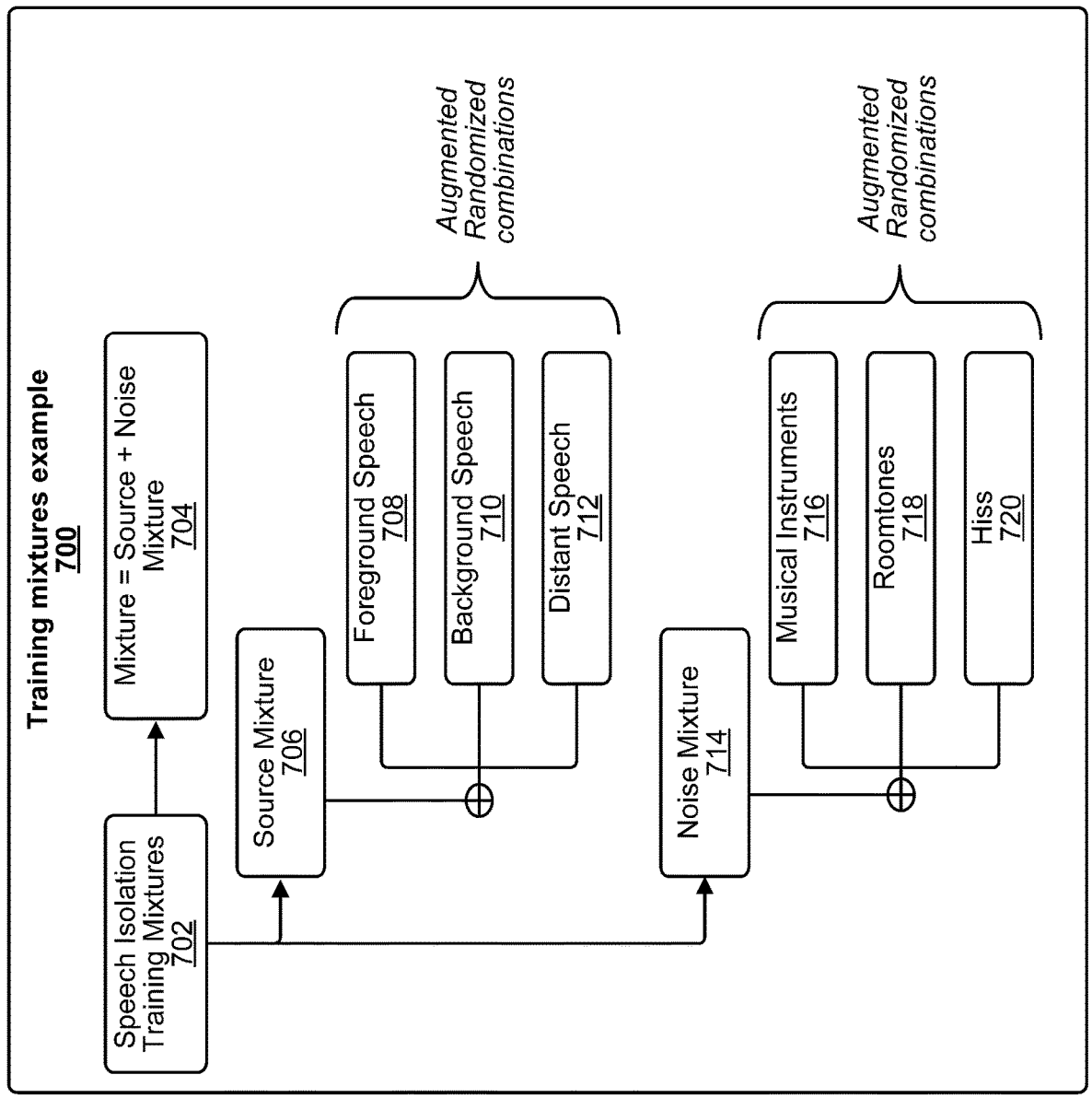
FIG. 7 illustrates example machine learning training methods including a training mixture example, in accordance with one or more implementations.

Referring to FIGS. 6 and 7, example implementations of machine learning training methods 600 will now be described. In these examples, machine learning training methods are described relating to methods of training for improvements and/or useful functionality in output signal quality and source separation. Referring to block 3.1, a first machine learning training method includes upscaling the trained network sample rate (e.g., 24 kHz to 48 kHz). Due to limitations of time, computing resources, etc., a model may be trained at 24 kHz with a 24 kHz dataset, but with limitations on output quality. An upscaling process undertaken on the model trained at 24 kHz can provide for functioning at 48 kHz. One example process includes keeping the inner blocks of the masking network's learned parameters while the encoder/decoder layers, and those immediately connected to them, are discarded. In other words, only the inner separation layers are transplanted into a freshly initialized model with a 48 kHz encoder/decoder. Next, the untrained 48 kHz encoder/decoder and those layers immediately connected, are fine-tuned using a 48 Khz dataset, while the inherited network remains frozen. This is done until acceptable validation/loss values (e.g., L1, L2, SISDR, SDSDR, or other loss calculation) are seen again during training/validation indicating now adapted inherited layers. For example, acceptable validation/loss values may be determined by observing a trend towards values seen in prior training sessions compared to model performance, by comparing to a predetermined threshold loss value, or other approach. During training, loss values ideally trend towards minimization, however in practice loss values may also be useful in signaling significant issues during training, such as when loss values start trending away from minimization. It has also been observed that although loss values may not be improving during training, the model's performance as measured by the quality of the source separation may still be improved by continuing with training.

Finally, fine-tune training continues across all layers to allow the model to develop further at 48 Khz, the end result being a well-performing 48 Khz model. In some implementations, the system is trained to operate at a high signal-processing sample-rate more rapidly by training at a lower sample-rate, inheriting appropriate layers into a higher sample-rate model architecture and performing a two-step training process where firstly the untrained layers are trained while inherited layers' parameters are frozen, and secondly the entire model is then fine-tuned until performance matches or surpasses that of the lower sample rate model. This process could be performed over many iterations including, but not limited to:

a) train at 6 kHz
b) upscale to 12 kHz
c) upscale to 24 kHz
d) upscale to 48 kHz Referring to block 3.2, multi-voice source mixtures are used to improve performance of the speech isolation model (e.g., source=foreground, background and distant voices, noise, and music mixtures). Speech initially trained on single voice vs. noise/music mixtures may not work well and the processed results may have issues around consistently extracting from original source media and suffer substantial artefacting. Instead of training with single voice vs noise mixtures, the audio processing system may provide substantially improved results by using multiple-voice sources layered to simulate variations in proximity such as foreground and background voices. This approach can also be applied to instruments, for example, multiple overlaid guitar samples in a mixture instead of just one sample at a time. In various implementations, training samples comprising various layers scenarios may be selected (e.g., based on user input, identified source class, and/or analysis of the unseen audio mixture during iterative training) to match and/or approximate the unseen audio mixture.

A training mixtures example 700 includes speech isolation training mixtures 702, which include mixtures of source and noise 704. The source mixture 706 may include a mixture of foreground speech 708, background speech 710, and distant speech 712, in augmented randomized combinations. The noise mixture 714 includes a mixture of musical instruments 716, room tones 718, and hiss 720, in augmented randomized combinations.

Figure 8:
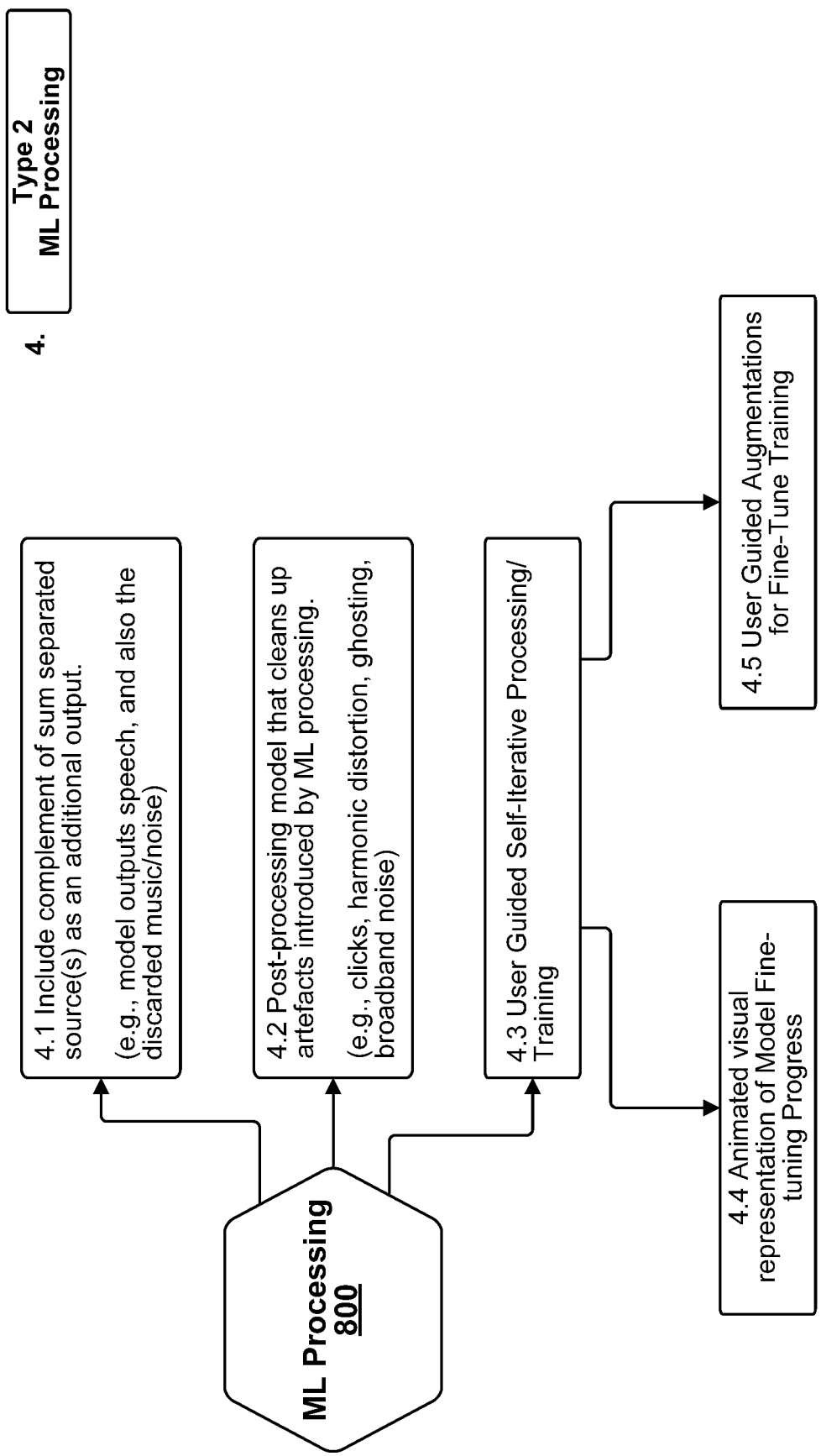
FIG. 8 illustrates example machine learning processing, in accordance with one or more implementations.
Figure 9:
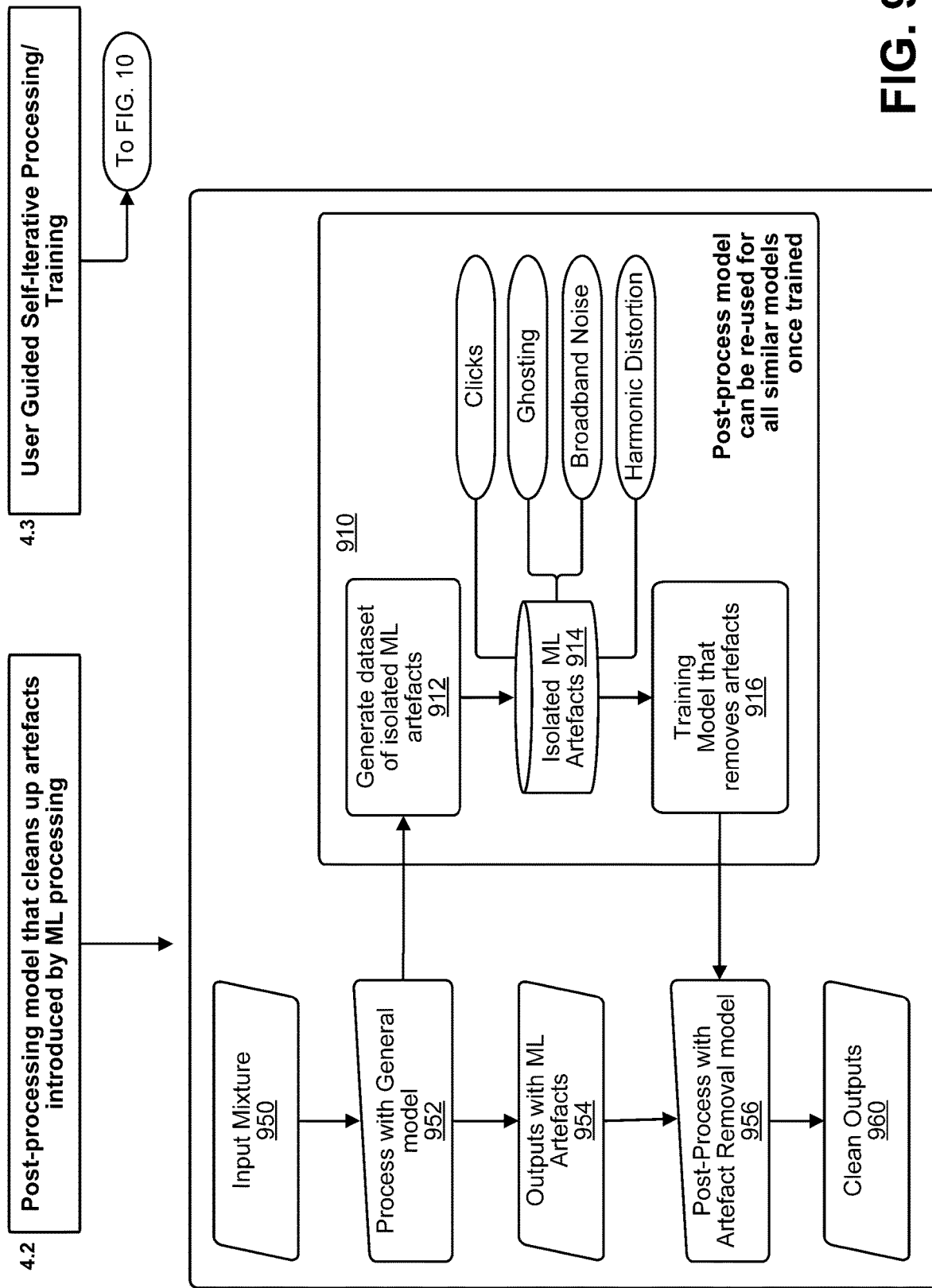
FIG. 9 illustrates an example post-processing model configured to clean up artefacts introduced by machine learning processing, in accordance with one or more implementations.
Figure 10:
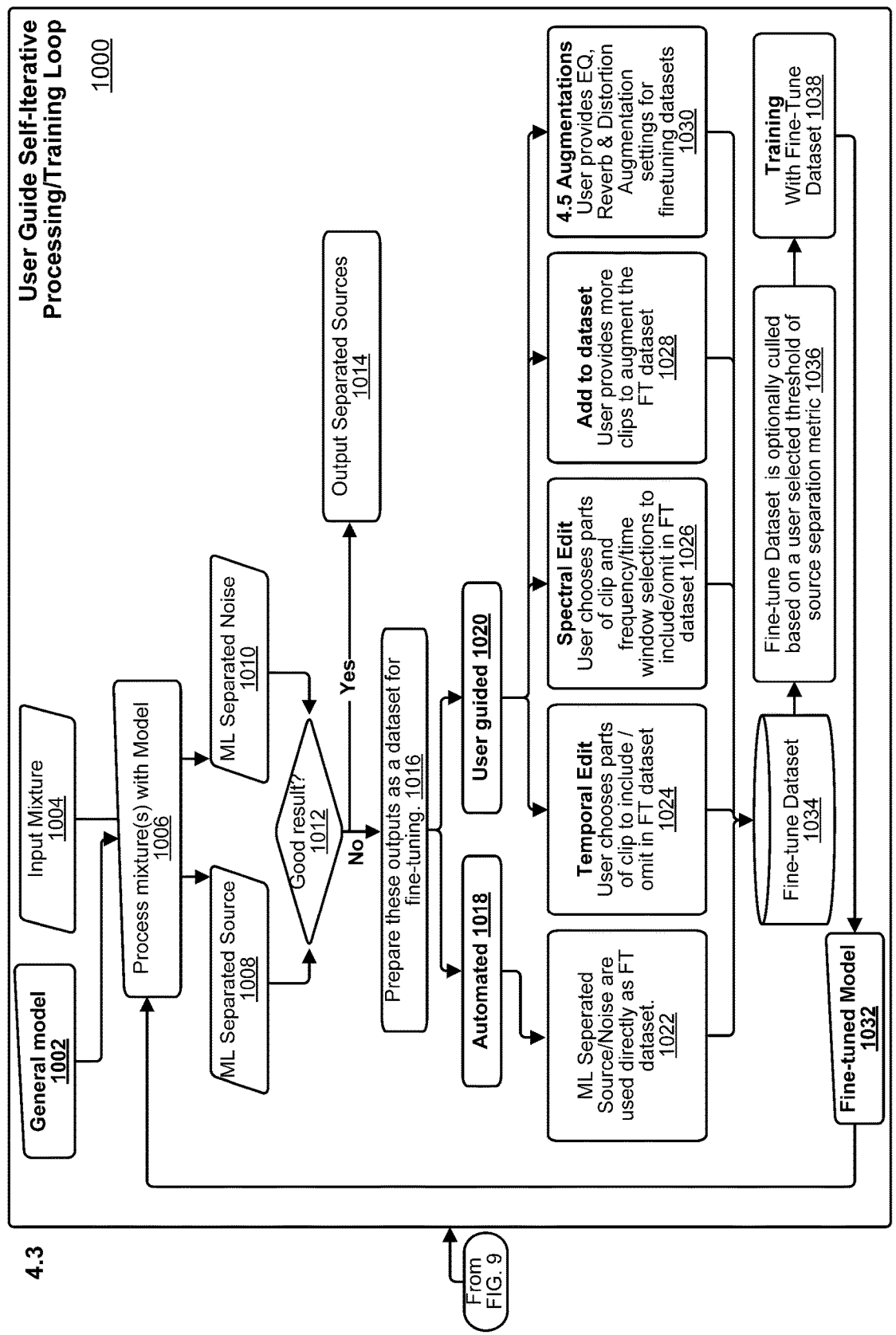
FIG. 10 illustrates an example user guided, self-iterative processing training loop, in accordance with one or more implementations.

Referring to FIGS. 8-10, implementations of machine learning processing 800 will now be described relating to methods of processing with machine learning models that have contributed improvements and/or useful functionality in output signal quality and source separation (e.g., as previously discussed herein). Referring to block 4.1, machine learning processing may include complement of sum separated source(s) as an additional output. In other implementations, the model outputs speech and the discarded music/noise. Complement output may be subsequently used in various processes to further process/separate sources remaining in the complement output.

Referring to block 4.2, the machine learning post-processing model cleans up artefacts introduced by machine learning processing, such as clicks, harmonic distortion, ghosting, and broadband noise (artefacts may be determined, for example, as previously discussed with reference to FIG. 4). The source separation models that are trained may exhibit artefacting such as clicking, harmonic distortion, broadband noise and "ghosting" where a sound is partly separated between the target complement outputs. In order for these outputs to be used in the context of a high-quality soundtrack, laborious clean-up would normally need to be attempted using conventional audio repair software. Attempting to do so may still yield undesirable qualities in the repaired audio. This may be addressed by post-processing the processed audio with a model which has been trained on a dataset consisting of processing artefacts. The processing artefacts dataset may be generated by the problematic model itself.

A post-process model 910 can be re-used for all similar models once trained. In the illustrated implementation, an input mixture 950 is processed with a general model 952, which generates source separated outputs with machine learning artefacts (step 954). A post-processing step 956 removes the artefacts to generate enhanced outputs 960. The post-processing model 910 includes generating a dataset 914 of isolated machine learning artefacts (step 912). The machine artefacts may include clicks, ghosting, broadband noise, harmonic distortion, and other artefacts. The isolated machine learning artefacts 912 are used to train a model that removes artefacts in step 916.

Referring to block 4.3, in some implementations, a user guided self-iterative processing/training approach may be used. The user can guide and contribute to the fine-tuning of a pre-trained model over the course of a processing/editing/training loop which can then be used to render better source separation results than would have been possible from a general model. Model fine-tuning ability can be put into the hands of the user in order to solve source separation that a pre-trained model may not be able to solve. Processing with a source separation model on unseen mixtures isn't always successful, usually due to lack of sufficient training data. In one solution, the audio processing system uses a method whereby the user can guide and contribute fine-tuning pre-trained inputs, which then can be used to render better results. In an example method, i) the user processes input media, ii) is given an opportunity to assess output, or has the option to let this assessment be performed by an algorithm that measures threshold parameters against some metrics (e.g., measured using a moving RMS window as previously discussed and/or other measurements), iii) if the output is deemed acceptable, processing ends here, otherwise iv) given the opportunity to manipulate imperfect outputs using temporal and/or spectral editing, and/or culling/augmenting algorithm. Essentially selecting sections of outputs that will best help during the imminent step. In step v) media is now considered for inclusion in a training dataset, in step vi) the user is given the opportunity to also add their own auxiliary dataset, in step vii) the model is fine-tune trained according to user's hyper-parameter preferences, in step viii) the model's performance is validated to confirm improved results from the prior iteration, and then in step ix) the process is repeated. In various implementations, hyperparameters relevant to fine-tune training may include parameters such as training segment length, epoch duration, training scheduler type and parameters, optimizer type and parameters, and/or other hyperparameters. The hyperparameters may be initially based around a set of predetermined values, and then modified by the user for fine-tune training.

An example user guided, self-iterative process 1000 is illustrated in FIG. 10. The process 1000 begins with a general model 1002, which may be implemented as a pretrained model as previously discussed. An input mixture 1004, such as a single-track audio signal, or a plurality of single-track audio signals, with an unseen source mixture, is processed through the general model 1002 in step 1006 to generate separated audio signals from the mixture, including machine learning separated source signals 1008 and machine learning separated noise signals 1010. In step 1012, the results are evaluated to confirm the separated audio sources have a sufficient quality (e.g., comparing an estimated MOS and threshold as previously described and/or other quality measurement). If the results are determined to be good, then the separated sources are output in step 1014.

If the separated audio source signals are determined to need further enhancement, then one or more of the outputs are prepared for inclusion in a training database for fine-tuning in step 1016. In an automated fine-tuning system 1018, the machine learning separated source 1008 and noise 1010 are used directly as a fine-tuning dataset 1034 (step 1022). The fine-tuning dataset is optionally culled based on a user selected threshold of a source separation metric (e.g., comparing a moving RMS window to a threshold as previously described and/or other separation metric), in step 1036. Training is then conducted at step 1038 to fine-tune the model. The fine-tuned model 1032 is then applied to the input mixture at step 1006.

In a user-guided fine-tuning system 1020, the user may choose parts of the audio clip to include or omit from the fine-tune dataset (step 1024—Temporal Edit). The user may also choose parts of the clip and frequency/time window selections to include/omit in the fine-tune dataset (step 1026—Spectral Edit). In some implementations, the user may provide more audio clips to augment the fine-tune dataset (step 1028—Add to dataset). In some implementations, the user provides equalization, reverb, distortion and/or other augmentation settings for finetuning datasets (step 1030—Augmentations). After the fine-tune dataset 1034 is updated, the training process continues through steps 1036 and 1038 to generate the fine-tuned model 1032.

Referring to block 4.4, an animated visual representation of model fine-tuning progress may be implemented. While the user fine-tune trains a model to solve source separation on particular media clip, the model's progressive outputs are displayed to help indicate the model's performance, in order to help guide user's decision making. In some implementations, for example, the interface may be displayed in a window with associated tool icons that display a periodically updated spectrogram animation representation of the estimated outputs as calculated by a periodically tested fine-tuned model while it is being fine-tune trained. This interface can allow the user to visually assess how well the model is currently performing in various regions of the input mixture. The interface may also facilitate user interactions such as allowing the user to experiment with time/frequency selections of these estimate outputs based on interactions with the spectrogram window.

Referring to block 4.5, user guided augmentations for fine-tune training may be implemented. To improve results when enhancing separating targeted recording with specific characteristics such as reverberation, filtering, non-linear distortion, the audio processing system may present the user with tools controlling underlying algorithms to guide and contribute to selection of augmentations such as reverberation, filtering, non-linear distortion, and/or noise during step 1020 of the loop described in block 4.3. The user can guide and contribute to the selection of augmentations and/or augmentation parameters used during fine-tuning of a pre-trained model over the course of a processing/editing/training loop. Augmentation includes user-controllable randomization settings for each parameter (e.g., values that affect various aspects of the augmentations such as intensity, density, modulation, and/or decay of a reverberation augmentation)in order to help generalize or narrow targeted behavior after fine-tuning. This allows for an extension of the control that the user has over fine-tune training, which enables them for example, to specifically match filtered sound/reverberation in a targeted recording. When referring to random processes or randomization, it may be sufficient to have a pseudorandom process or an arbitrary selection process. In some implementations, the augmentation parameters are matched automatically to an input source mixture, using one or more algorithms. In some implementations, the automatic matching is used to achieve a crude match as a starting point. For example, spectral analysis of a target input mixture may be combined with analysis of random dataset samples to yield a set of frequency banded divergence scores that may be used to minimize divergence between random augmented dataset samples and the target input mixture by adjusting various parameters of a dataset augmentation filter based on the values of the frequency banded divergence scores.

Figure 11A:
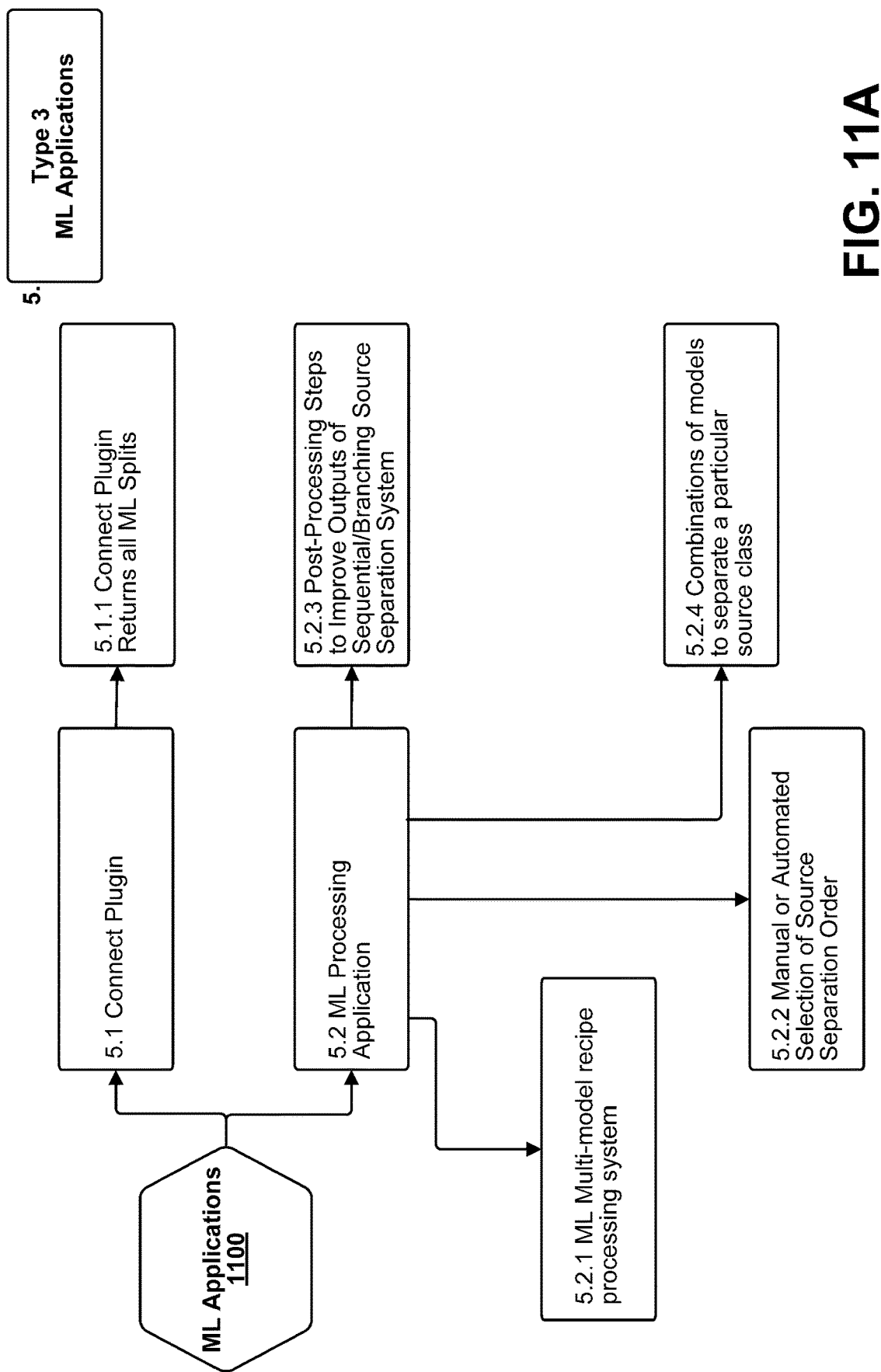
FIG. 11 comprises FIGS. 11A and 11B, which illustrate example machine learning applications, in accordance with one or more implementations.
Figure 11B:
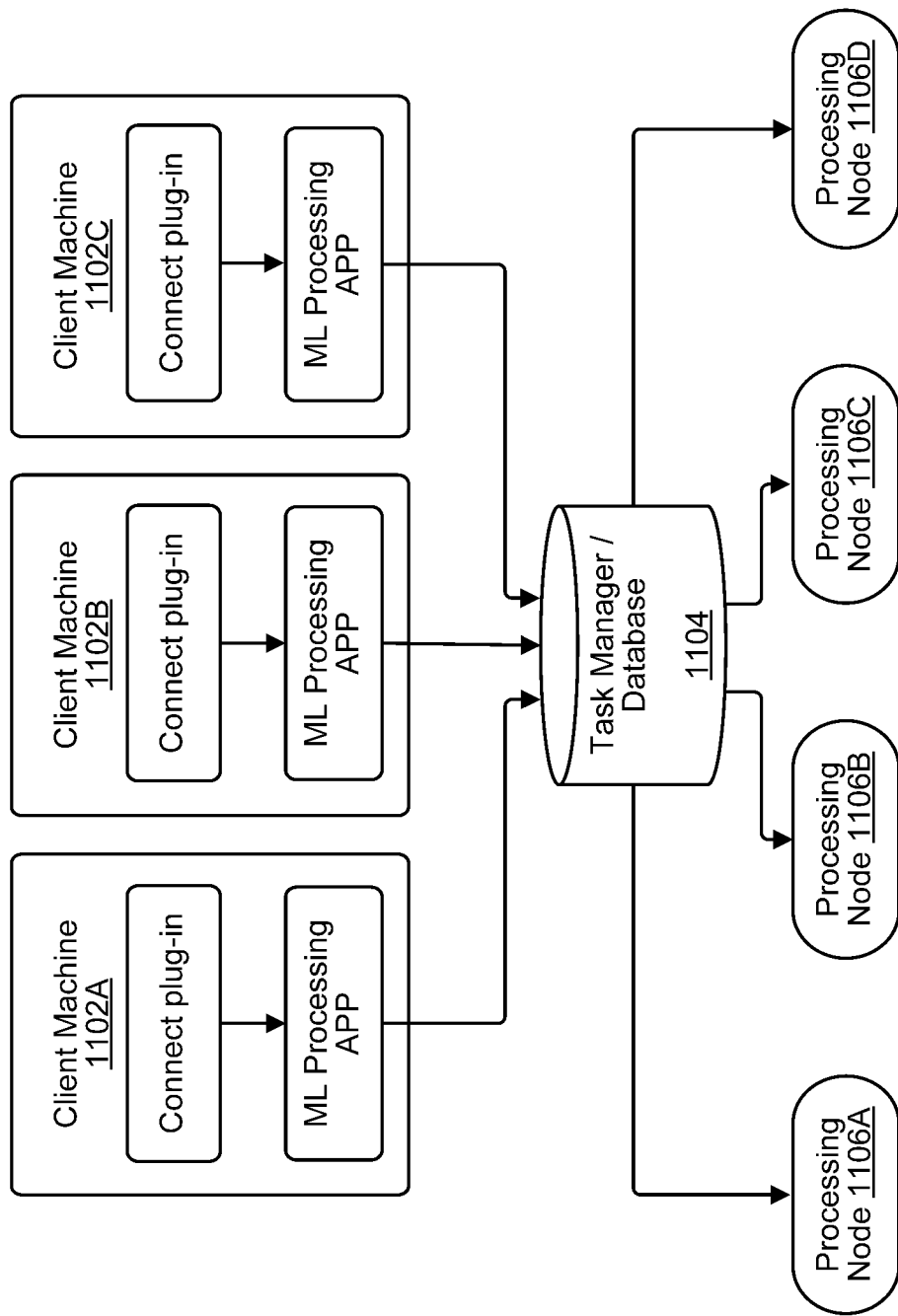

Referring to FIGS. 11A and 11B, example implementations of machine learning applications 1100 will now be described, in accordance with one or more implementations. The audio processing systems and methods disclosed herein may be used in conjunction with other audio processing applications that have contributed improvements and/or useful functionality to sound post-production editing workflows.

Referring to block 5.1, a plugin such as an Avid Audio Extension (AAX) plugin hosted in a digital audio workstation (DAW) (e.g., a digital audio workstation sold under the brand name PRO TOOLS may be used in one or more implementations), is provided and allows a user to send audio clips from a standalone application where they may be subsequently processed with machine learning models. This plugin can return an arbitrary number of stem splits back to the DAW environment.

Referring to block 5.2, implementations of the present disclosure have also been used in an application (e.g., an application sold under the brand name JAM LAB with JAM CONNECT or similar application) that loads/receives media which is then processed by a user-selected machine learning recipe. In some implementations, a plurality of client machines 1102A-C and a processing node 1106A-D, having access to client software (e.g., JAM LAB with JAM CONNECT) are configured to access a task manager/database 1104 for access to both the client software and the machine learning (ML) applications 1100 as disclosed herein.

Figure 12:
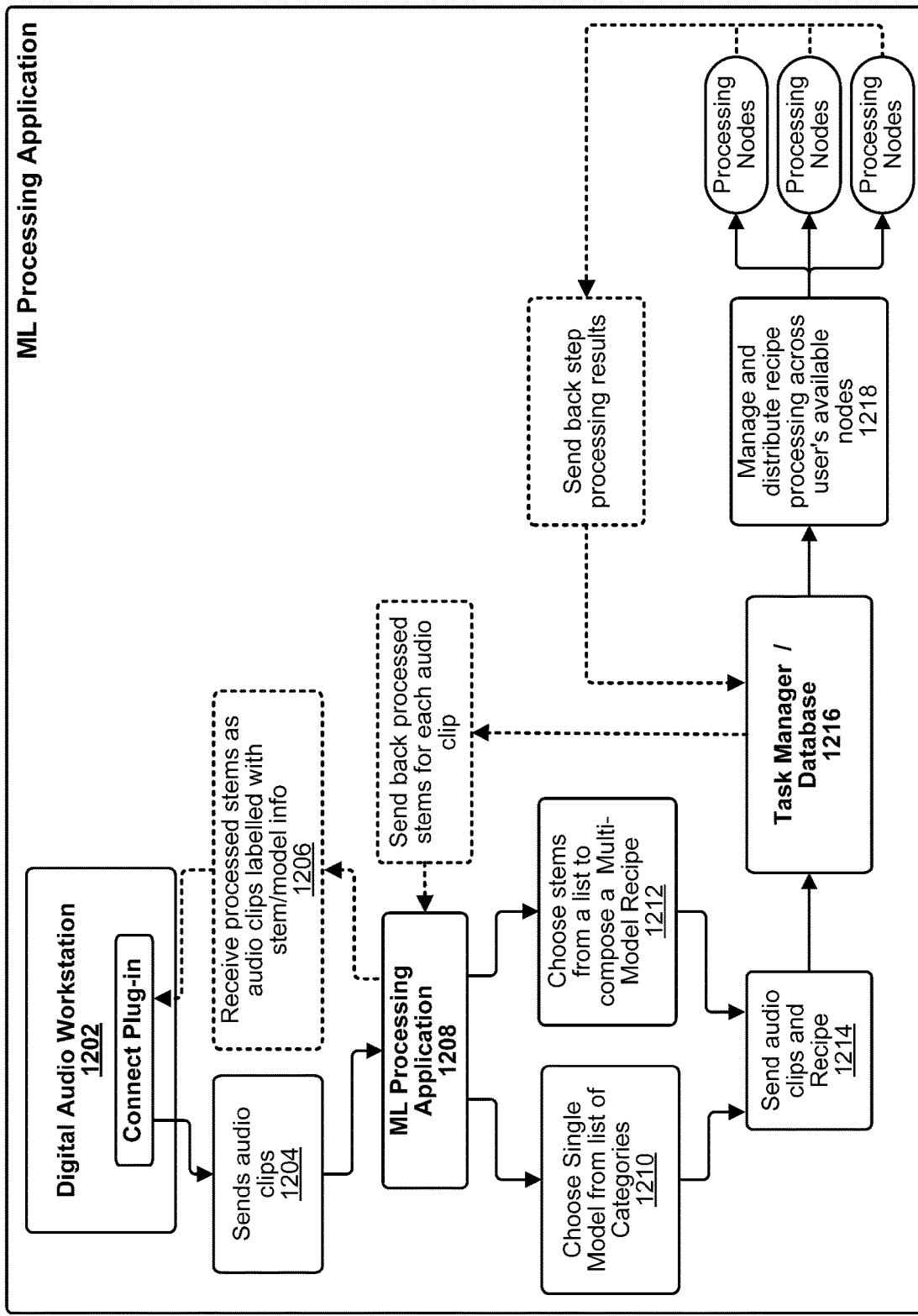
FIG. 12 illustrates example machine learning processing application, in accordance with one or more implementations.

Referring to FIG. 12, an example processing flow will now be described. A system running a digital audio workstation 1202 (e.g., PRO TOOLS with JAM CONNECT) is configured to send audio clips to a client application 1208 (e.g., including JAM LAB). Through the client application, a single model may be chosen from a list of categories 1210 for processing/separating the audio sources from the audio clips. The types of stems are also chosen in step 1212 to compose a multi-model recipe. The audio clips and recipe are sent (in step 1214) to a task manager/database 1216, which manages and distributes recipe processing across the user's available processing nodes in step 1218. The client application receives and returns processed audio clips labeled with stem and/or model names in step 1206. In some implementations, the client application 1208 may also facilitate choosing stems to compose a multi-model recipe 1212 as disclosed herein.

Implementations of a machine learning multi-model recipe processing system will now be described with reference to FIGS. 13A-E. In some implementations, the user may desire to separate targeted media into a set of source classes/stems in one step, using a selection of source separation models, in a particular order and hierarchical combination. A sequential/branching source separation recipe schema is implemented for processing the targeted media using one or more source-separation models in a sequential/branching structured order, to separate a targeted media into a set of user-selected source classes or stems.

Figure 13A:
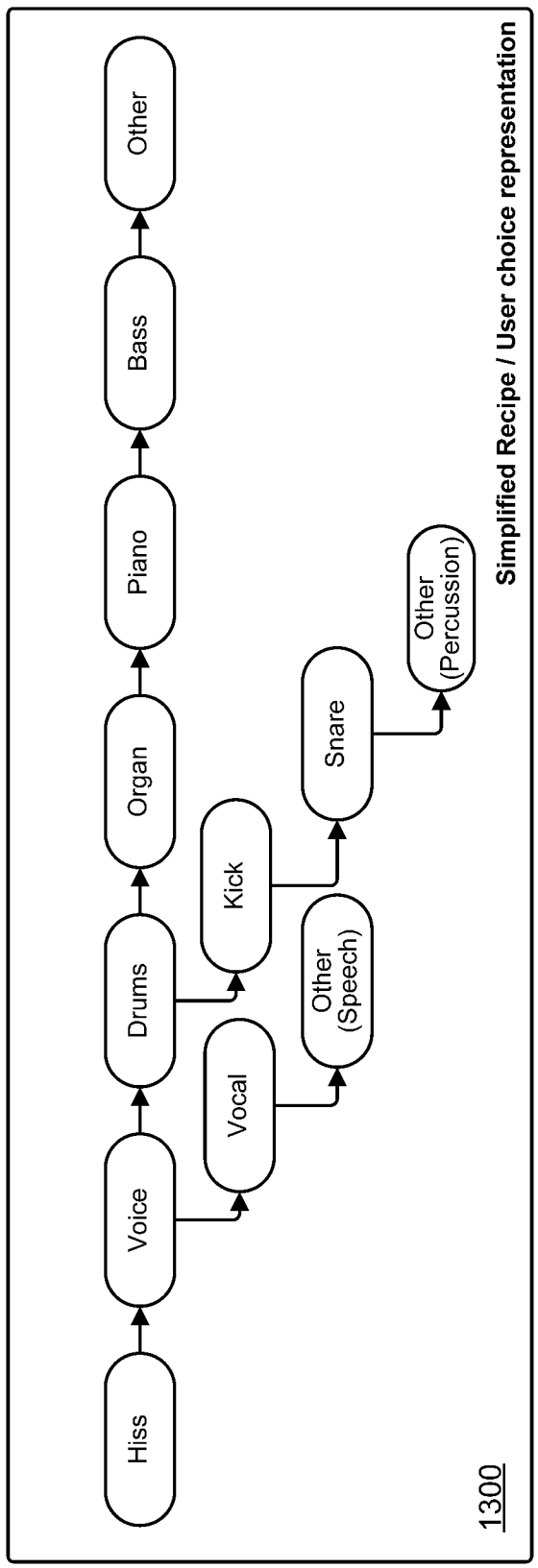
FIG. 13 comprises FIGS. 13A, 13B, 13C, 13D, and 13E, which illustrate one or more examples of a multi-model recipe processing system, in accordance with one or more implementations.

In the implementation 1300 of FIG. 13A, each step of the recipe represents a source-separation model or combination of models that targets a particular source class. The recipe is defined according to a recipe schema to perform the steps that result in the user's desired stem outputs, and includes appropriately trained models. As illustrated in the example implementation, the user may choose to separate Hiss first, followed by Voice (subsequently separated into vocals and other speech), Drums (subsequently separated into kick, snare and other percussion), Organ, Piano, Bass, and other processing. Thus, by processing the targeted media through the pipeline defined by the recipe, the output at various steps may be collected to ultimately separate targeted media into a set of user-selected source classes or stems.

Figure 13B:
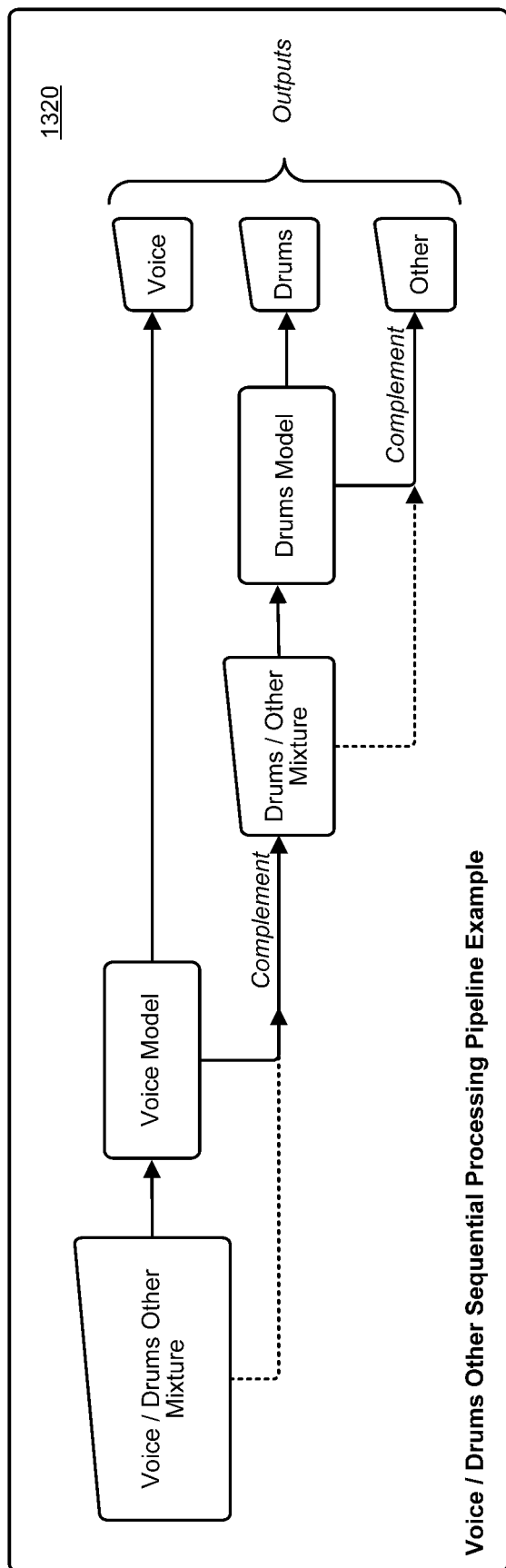

Referring to FIG. 13B, a voice/drums other sequential processing pipeline example 1320 is illustrated. In this model, the input mixture is first processed to extract the voice and the complement includes drums and other sounds in the mixture. The drums model extracts the drums and the complement includes other sounds. In this implementation, the output includes the voice, drums and other stems.

Figure 13C:
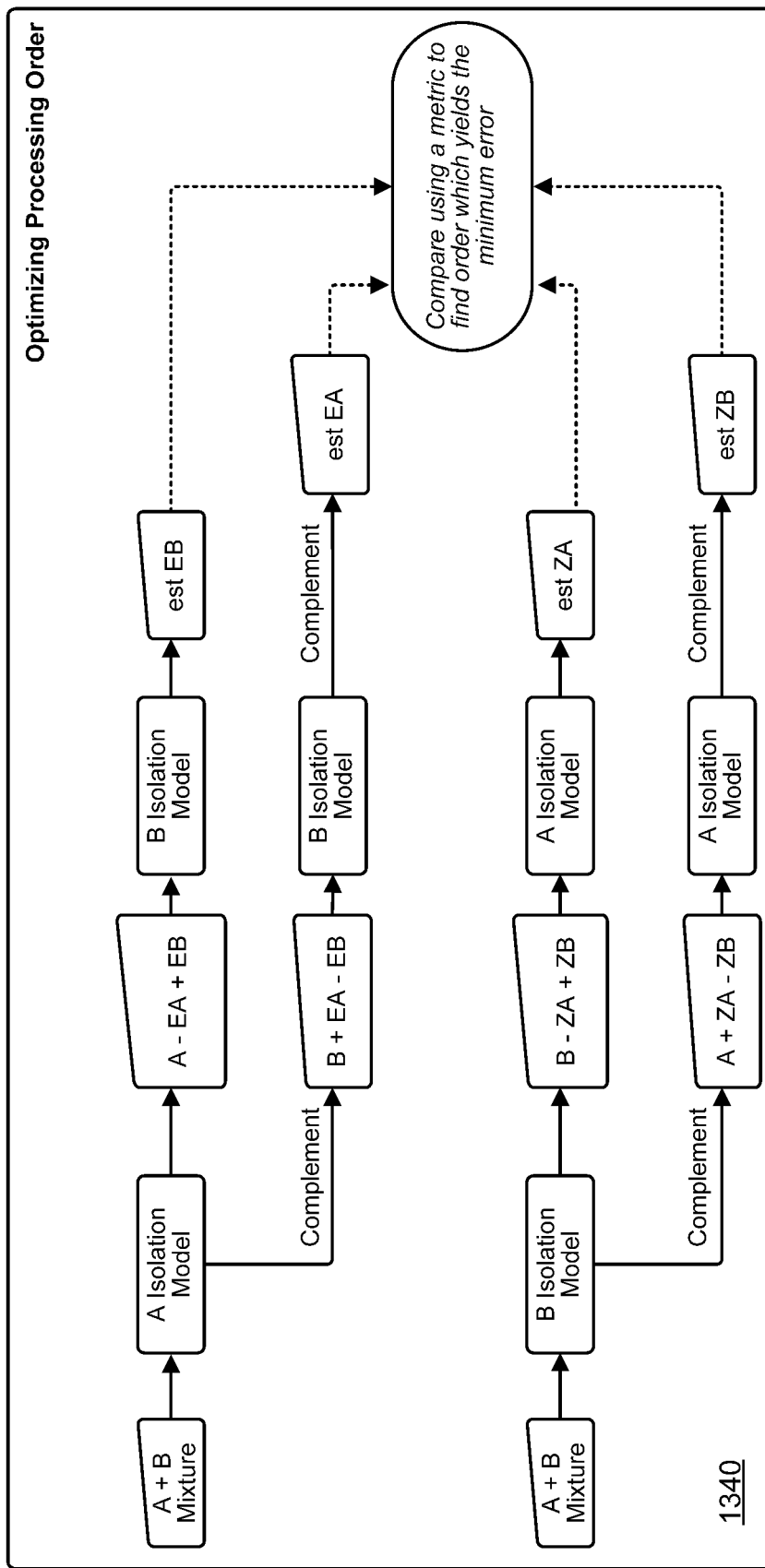

The order in which models are applied when separating source classes with a sequential/branching separation system may be optimized for higher quality by using an algorithm that assesses optimal processing order. An example implementation of an optimized processing method 1340 is illustrated in FIG. 13C. For example, an input mixture model comprising A and B components may be configured to isolate class A, and then remainder B. This may yield a different result if the processing order was reversed (e.g., isolate B then A). The optimized processing method 1340 may operate on an input mixture of A+B by separating A and B in both orders, comparing the results and selecting the order with the best results (e.g., the result with less error in the separated stems). In various implementations, the optimized processing method 1340 may operate manually, automatically, and/or in a hybrid approach. For example, an estimated optimal order may be pre-established by using a set of ground truth test samples to create test mixtures that may then be separated using the various permutations of stem order, and thus an estimated best-performing model processing order may be established by using an error function that compares the outputs of these tests against the ground truth test samples.

Figure 13D:
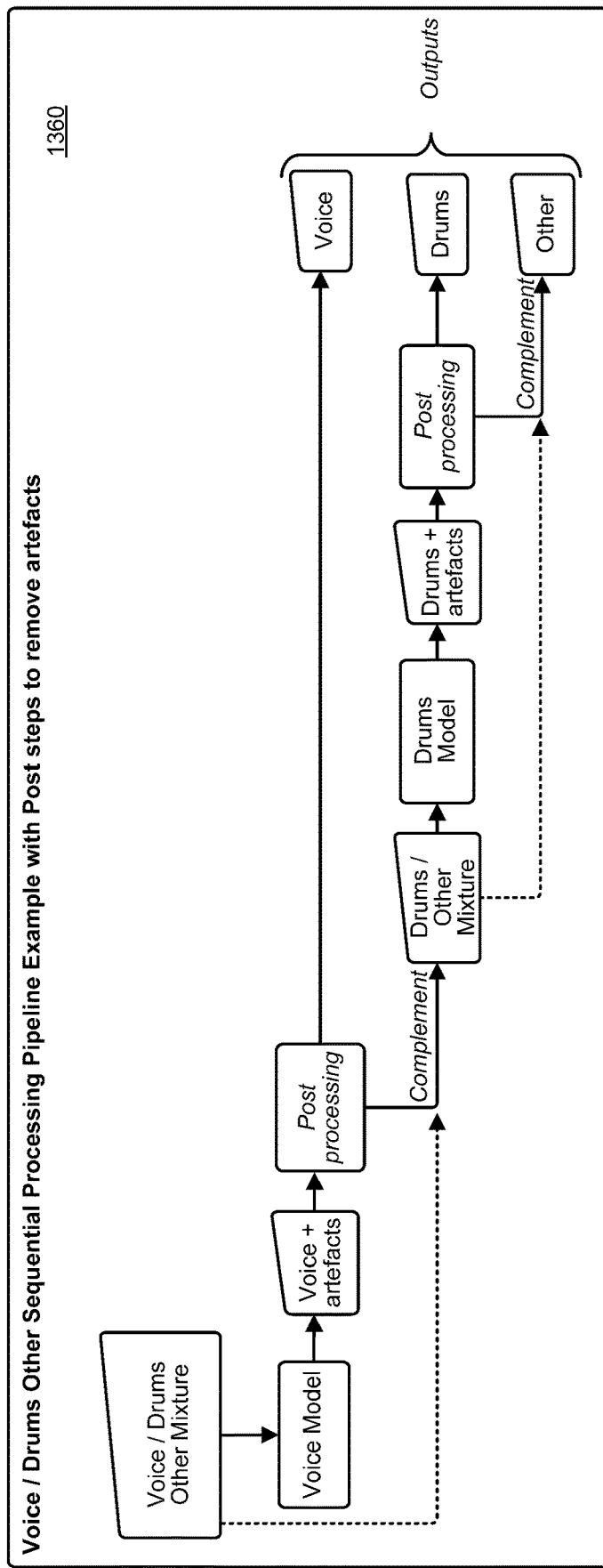

An example pipeline 1360 for improving output fidelity (e.g., as previously described herein) of a sequential/branching source separation system will now be described with reference to FIG. 13D. For example, output fidelity may be measured use an MOS algorithm that is able to measure divergence of the stem's output from a particular labeled dataset, such as a collection of speech samples from an individual. In some implementations, such an algorithm may be implemented as a neural network that has been pre-trained to either classify a source or to measure divergence of the source from a given dataset.

A processing recipe (see 5.2.1) may also include post-processing steps after one or more outputs the in pipeline. A post-processing step could include any type of digital signal processing filters/algorithms that clean up signal artefacts/noise that may have been introduced by previous steps. The pipeline 1360 uses models specifically trained to clean artefacts (e.g., as described in step 4.2 herein), yielding much improved overall results, especially due to the sequential nature of the recipe processing pipeline.

Figure 13E:
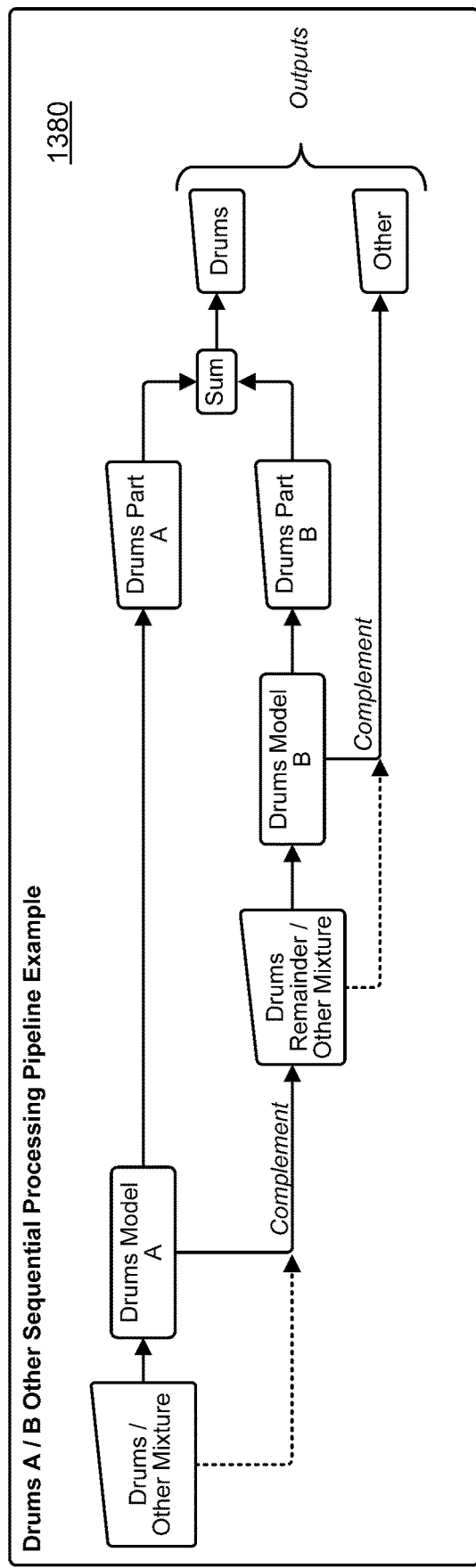

Referring to FIG. 13E, an example implementation 1380 combines models to separate a particular source class. A sequential/branching separation processing recipe (see 5.2.1) may include steps where one or more models are used in combination to extract a source class from a mixture that otherwise fails to be extracted completely by just one model that has been trained to target that source class. In the illustrated example, drums are separated twice and subsequently summed and presented as a single "Drums" output stem, accompanied by the complimentary "Other" stem.

Figure 14:
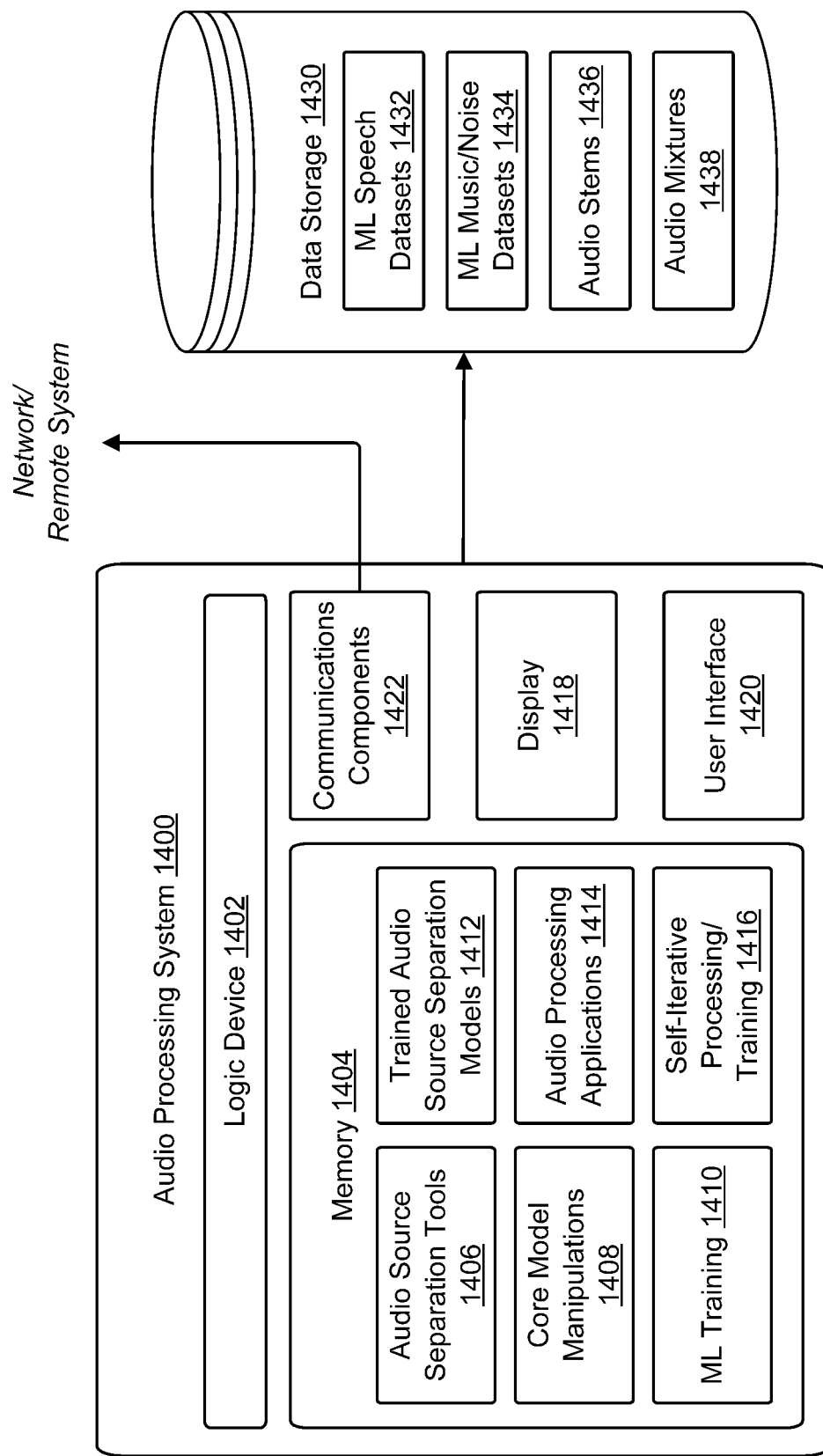
FIG. 14 illustrates an example audio processing system, in accordance with one or more implementations.

An example audio processing system 1400 for implementing the systems and methods disclosed herein will now be described with reference to FIG. 14. The audio processing system 1400 is includes a logic device 1402, a memory 1404, communications components 1422, a display 1418, a user interface 1420, and a data storage 1430.

The logic device 1402 may be include, for example, a microprocessor, a single-core processor, a multi-core processor, a microcontroller, a programmable logic device configured to perform processing operations, a DSP device, one or more memories for storing executable instructions (e.g., software, firmware, or other instructions), a graphics processing unit and/or any other appropriate combination of processing device and/or memory configured to execute instructions to perform any of the various operations described herein. Logic device 1402 is adapted to interface and communicate with various components of the audio processing system 1400 including the memory 1404, communications components 1422, display 1418, user interface 1420, and data storage 1430.

Communications components 1422 may include wired and wireless communications interfaces facilitating communications with a network or remote system. Wired communications interfaces may be implemented as one or more physical network or device connection interfaces, such as cables or other wired communications interfaces. Wireless communications interfaces may be implemented as one or more Wi-Fi, Bluetooth, cellular, infrared, radio, and/or other types of network interfaces for wireless communications. The communications components 1422 may include an antenna for wireless communications during operation.

Display 1418 may include an image display device (e.g., a liquid crystal display (LCD)) or various other types of generally known video displays or monitors. User interface 1420 may include, in various implementations, a user input and/or interface device, such as a keyboard, a control panel unit, a graphical user interface, or other user input/output. The display 1418 may operate as both a user input device and a display device, such as, for example, a touch screen device adapted to receive input signals from a user touching different parts of the display screen.

The memory 1404 stores program instructions for execution by the logic device 1402 including program logic for implementing the systems and methods disclosed herein, including but not limited to audio source separation tools 1406, core model manipulations 1408, machine learning training 1410, trained audio separation models 1412, audio processing applications 1414, and self-iterative processing/training logic 1416. Data used by the audio processing system 1400 may be stored in the memory 1404 and/or stored in data storage 1430, and may include machine learning speech datasets 1432, machine learning music/noise datasets 1434, audio stems 1436, audio mixtures 1438, and/or other data.

In some implementations, one or more processes may be implemented through a remote processing system, such as a cloud platform which may be implemented as an audio processing system 1400 as described herein.

Figure 15:
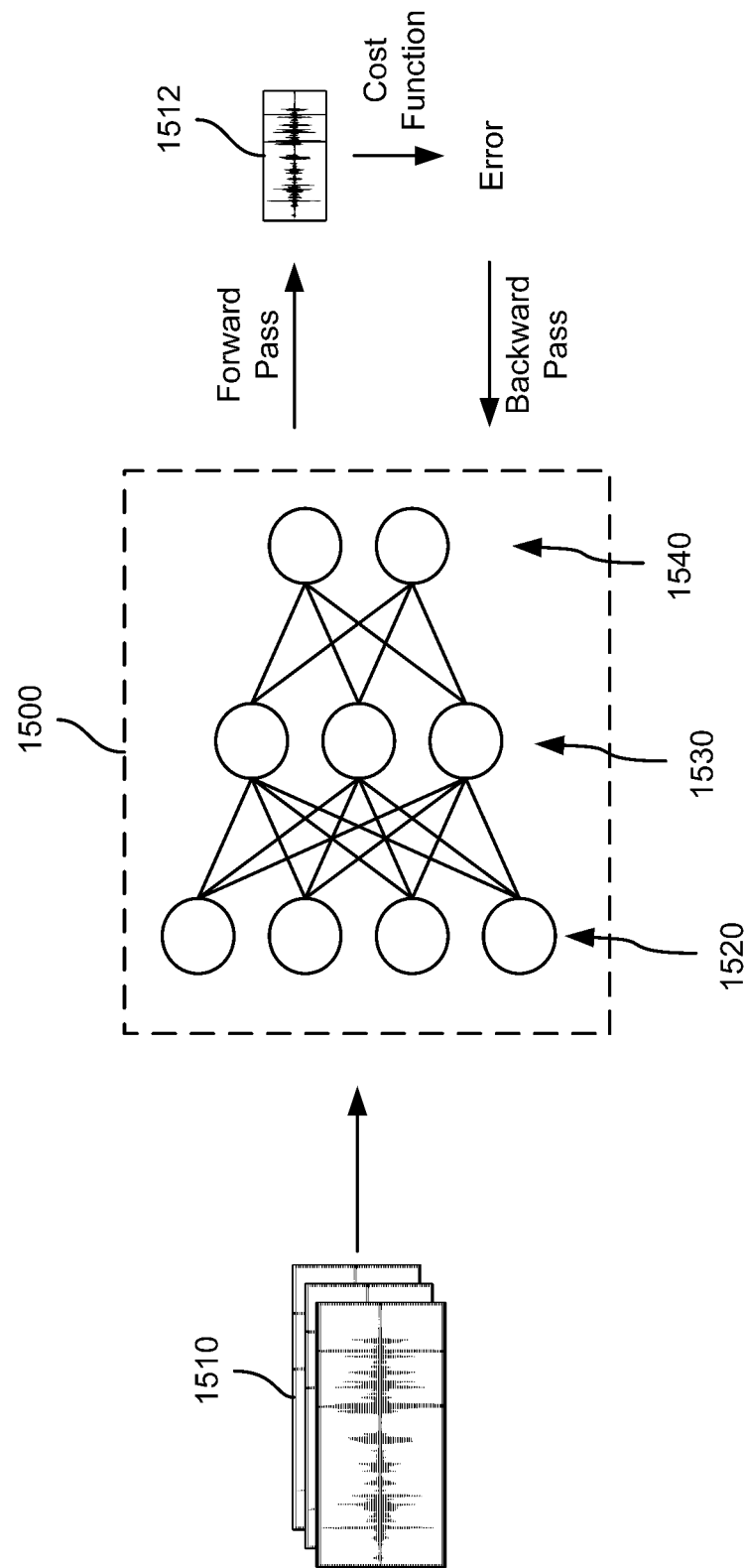
FIG. 15 illustrates an example neural network that may be used in one or more of the implementations of FIGS. 1-14, in accordance with one or more implementations.

FIG. 15 illustrates an example neural network that may be used in one or more of the implementations of FIGS. 1-14, including various RNNs and models as described herein. A neural network 1500 is implemented as a recurrent neural network, deep neural network, convolutional neural network or other suitable neural network that receives a labeled training dataset 1510 to produce audio output 1512 (e.g., one or more audio stems) for each input audio sample. In various implementations, the labeled training dataset 1510 may include various audio samples and training mixtures as described herein, such as training datasets (FIG. 3), a self-iterative training dataset or culled dataset (FIG. 4), training mixtures and datasets described in accordance with training methods described herein (FIGS. 5-13E), or other training datasets as appropriate.

The training process to generate a trained neural network model includes a forward pass through the neural network 1500 to produce an audio stem or other desired audio output 1512. Each data sample is labeled with the desired output of the neural network 1500, which is compared to the audio output 1512. In some implementations, a cost function is applied to quantify an error in the audio output 1512 and a backward pass through the neural network 1500 may then be used to adjust the neural network coefficients to minimize the output error.

The trained neural network 1500 may then be tested for accuracy using a subset of the labeled training data 1510 set aside for validation. The trained neural network 1500 may then be implemented as a model in a runtime environment to perform audio source separation as described herein.

In various implementations, the neural network 1500 processes input data (e.g., audio samples) using an input layer 1520. In some examples, input data may correspond to audio samples and/or audio input as previously described herein.

Input layer 1520 includes a plurality of neurons that are used to condition input audio data for input to the neural network 1500, which may include feature extraction, scaling, sampling rate conversion, and/or the like. Each of the neurons in input layer 1520 generates an output that is fed to the inputs of one or more hidden layers 1530. Hidden layer 1530 includes a plurality of neurons that process the outputs from input layer 1520. In some examples, each of the neurons in hidden layer 1530 generates an output that collectively are then propagated through additional hidden layers that include a plurality of neurons that process the outputs from the previous hidden layers. The outputs of the hidden layer(s) 1530 are fed to an output layer 1540. Output layer 1540 includes one or more neurons that are used to condition the output from output layer 1540 to generate the desired output. It should be understood that the architecture of neural network 1500 is representative only and that other architectures are possible, including a neural network with only one hidden layer, a neural network without an input layer and/or output layer, a neural network with recurrent layers, and/or the like.

In some examples, each of input layer 1520, hidden layer(s) 1530, and/or output layer 1540 includes one or more neurons. In some examples, each of input layer 1520, hidden layer(s) 1530, and/or output layer 1540 may include a same number or a different number of neurons. In some examples, each of the neurons takes a combination (e.g., a weighted sum using a trainable weighting matrix W) of its inputs x, adds an optional trainable bias b, and applies an activation function $f$ to generate an output a as shown in the equation $a=f(Wx+b)$. In some examples, the activation function $f$ may be a linear activation function, an activation function with upper and/or lower limits, a log-sigmoid function, a hyperbolic tangent function, a rectified linear unit function, and/or the like. In some examples, each of the neurons may have a same or a different activation function.

In some examples, the neural network 1500 may be trained using supervised learning where combinations of training data that include a combination of input data and a ground truth (e.g., expected) output data. Differences between the generated audio output 1512 and the ground truth output data (e.g., label) is fed back into neural network 1500 to make corrections to the various trainable weights and biases. In some examples, the differences may be fed back using a back-propagation technique using a stochastic gradient descent algorithm, and/or the like. In some examples, a large set of training data combinations may be presented to neural network 1500 multiple times until an overall cost function (e.g., a mean-squared error based on the differences of each training combination) converges to an acceptable level.

Example Implementations are Set Forth Below:

1. An audio processing system comprising a deep neural network (DNN) trained to separate one or more audio source signals from a single-track audio mixture.

2. The audio processing system of example 1, wherein the DNN is configured to receive a signal input and generate a signal output, without time-domain encoding and/or time-domain decoding.

3. The audio processing system of examples 1-2, wherein the DNN is configured to apply a windowing function.

4. The audio processing system of examples 1-3, wherein the DNN performs an overlap-add process to smooth banding artefacts.

5. The audio processing system of examples 1-4, wherein audio source separation is performed without applying a mask.

6. The audio processing system of examples 1-5, wherein the DNN model is trained using a 48 kHz sample rate.

7. The audio processing system of examples 1-6, wherein signal processing pipeline operates at 48 kHz.

8. The audio processing system of examples 1-7, further comprising a separation strength parameter that controls the intensity of the separation process applied to an input audio signal.

9. The audio processing system of examples 1-8, further comprising a speech training dataset comprising a plurality of labeled speech samples.

10. The audio processing system of examples 1-9, further comprising a non-speech training dataset comprising a plurality of labeled music and/or noise data samples.

11. The audio processing system of examples 1-10, further comprising a dataset generation module configured to generate labeled audio samples for use in training the DNN model.

12. The audio processing system of examples 1-11, wherein the dataset generation module is a self-iterative data set generator.

13. The audio processing system of examples 1-12, wherein the dataset generation module is configured to generate labeled audio samples from the input audio mixture and/or the audio source stems output from the DNN.

14. The audio processing system of examples 1-13 further comprising a dataloader configured to apply pre/post mixture augmentation.

15. The audio processing system of examples 1-14 wherein the DNN is trained at a higher than audible frequency to recognize separate stems of audio in the lower audible frequency range.

16. The audio processing system of examples 1-15, wherein a dataloader is configured to apply augmentations such as reverb, filter probability parameters.

17. The audio processing system of examples 1-16 further configured to match sonic qualities of target unseen mixtures during training based on relative signal levels.

18. An example method comprising:
processing audio input data using a trained inference model trained for source separation to generate source separated stems;
generating a speech dataset from the source separated stems;
generating a noise dataset from the source separated stems;
training the inference model using the speech dataset and the noise dataset to generate an updated inference model.

19. The method of example 18, further comprising processing the audio input data using the updated inference model.

20. The methods of examples 18-19, further comprising reiteratively updating the updated inference model.

21. The methods of examples 19-20, wherein a training dataset is curated to include samples that approximate the audio sources.

22. The methods of examples 19-21, further comprising a hierarchical mix bus schema.

23. The methods of examples 19-22, wherein the inference model is trained using multi-voice source mixtures.

24. The methods of examples 19-23, wherein the inference model is trained using foreground voices, background voices, and/or distant voices.

25. The methods of examples 19-24, wherein the inference model is trained at a first sample rate and upscaled to a higher sample rate.

26. The methods of examples 19-25, further comprising post-processing the separated audio source stems to remove artefacts introduced by the source separation process.

27. The methods of examples 19-26, wherein the source separated stems include a separated source signal and a remaining complement signal.

28. The methods of examples 19-27, wherein artefacts introduced during the source separation process include clicks, harmonic distortion, ghosting and/or broadband noise.

29. The methods of examples 19-28, wherein a fine-tuning process comprises user-guided self-iterative processing.

30. The methods of examples 19-29, further comprising facilitating user guided augmentations for fine-tuning of training.

31. A system comprising an audio input configured to receive an audio input stream comprising a mixture of audio signals generated from a plurality of audio sources, a trained audio source separation model configured to receive the audio input stream and generate a generated plurality of audio stems, the generated plurality of audio stems corresponding to one or more audio source of the plurality of audio sources, and a self-iterative training system configured to update the trained audio source separation model into an updated audio source separation model based at least in part on the generated plurality of audio stems, wherein the updated audio source separation model is configured to re-process the audio input stream to generate a plurality of enhanced audio stems.

32. The system of example 31, wherein the audio input stream comprises one or more single-track audio mixtures, and wherein the trained audio source separation model comprises a neural network trained to separate one or more audio source signals from the one or more single-track audio mixtures.

33. The system of examples 31-32, wherein the neural network is configured to perform audio source separation without applying a mask.

34. The system of examples 31-33, further comprising a training dataset comprising labeled source audio data and labeled noise audio data, and wherein the trained audio source separation model is trained using the training dataset to generate a general source separation model.

35. The system of examples 31-34, wherein at least a subset of the generated plurality of audio stems are culled based on a threshold metric and added to the training dataset to form a culled dynamically evolving dataset, and wherein the culled dynamically evolving dataset is used to train the updated audio source separation model.

36. The system of examples 31-35, wherein the self-iterative training system is further configured to calculate a first quality metric associated with the generated plurality of audio stems, the first quality metric providing a first performance measure of the trained audio source separation model, wherein the self-iterative training system is further configured to calculate a second quality metric associated with the enhanced audio stems, the second quality metric providing a second performance measure of the updated audio source separation model, and wherein the second quality metric is greater than the first quality metric.

37. The system of examples 31-36, wherein the trained audio source separation model is trained using a training dataset comprising a plurality of datasets, each of the plurality of datasets comprising labeled audio samples configured to train the system to address a source separation problem.

38. The system of examples 31-37, wherein the plurality of datasets comprise a speech training dataset comprising a plurality of labeled speech samples, and/or a non-speech training dataset comprising a plurality of labeled music and/or noise data samples.

39. The system of examples 31-38, wherein the self-iterative training system further comprises a self-iterative dataset generation module configured to generate labeled audio samples from the generated plurality of audio stems.

40. The system of examples 31-39, wherein the plurality of enhanced audio stems are generated using a hierarchical branching sequence comprising separating a source signal and a remaining complement signal.

41. A method comprising receiving an audio input stream comprising a mixture of audio signals generated from a plurality of audio sources, generating, using a trained audio source separation model configured to receive the audio input stream, a generated plurality of audio stems corresponding to one or more audio sources of the plurality of audio sources, updating, using a self-iterative training process, the trained audio source separation model into an updated audio source separation model based at least in part on the generated plurality of audio stems; and re-processing the audio input stream using the updated audio source separation model to generate a plurality of enhanced audio stems.

42. The method of examples 41, wherein the audio input stream comprises one or more single-track audio mixtures, and wherein the trained audio source separation model comprises a neural network trained to separate one or more audio source signals from the one or more single-track audio mixtures.

43. The method of examples 41-42, wherein the neural network is configured to perform audio source separation without applying a mask.

44. The method of examples 41-43, further comprising providing a training dataset comprising labeled source audio data and labeled noise audio data, and training the trained audio source separation model using the training dataset to generate a general source separation model.

45. The method of examples 41-44, further comprising adding at least a subset of the generated plurality of audio stems to the training dataset to produce a dynamically evolving dataset, culling the dynamically evolving dataset based on a threshold metric, and training the updated audio source separation model using the culled, dynamically evolving dataset.

46. The method of examples 41-45, wherein the self-iterative training process further comprises calculating a first quality metric associated with the generated plurality of audio stems, the first quality metric providing a first performance measure of the trained audio source separation model, calculating a second quality metric associated with the enhanced audio stems, the second quality metric providing a performance measure of the updated audio source separation model, and comparing the second quality metric to the first quality metric to confirm the second quality metric is greater than the first quality metric.

47. The method of examples 41-46, wherein the trained audio source separation model is trained using training dataset comprising a plurality of datasets, each of the plurality of datasets comprising labeled audio samples configured to train the audio source separation model to address a different source separation problem.

48. The method of examples 41-47, wherein the plurality of datasets comprise a speech training dataset comprising a plurality of labeled speech samples, and/or a non-speech training dataset comprising a plurality of labeled music and/or noise data samples.

49. The method of examples 41-48, wherein the self-iterative training process further comprises generating labeled audio samples from the generated plurality of audio stems for a self-iterative dataset.

50. The method of examples 41-49, further comprising generating the plurality of enhanced audio stems using a hierarchical branching sequence comprising separating a source signal and a remaining complement signal.

Where applicable, various implementations provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein. Implementations described above illustrate but do not limit the invention. It should also be understood that numerous modifications and variations are possible in accordance with the principles of the invention. Accordingly, the scope of the invention is defined only by the following claims.

What is claimed:

1. A method comprising:
receiving a single-track audio input sample comprising an unknown mixture of audio signals generated from a plurality of audio sources; and
separating one or more of the audio sources from the single-track audio input sample using a sequential audio source separation model, comprising:
(a) defining a processing recipe comprising a plurality of source separation processes comprising at least a first source separation process configured to process an audio input mixture and output a first set of one or more separated source signals and a first remaining complement signal mixture, and a second source separation process configured to process the first remaining complement signal mixture and output a second set of one or more separated source signals and a second remaining complement signal mixture; and
(b) processing the single-track audio input sample in accordance with the processing recipe to generate a plurality of audio stems separated from the unknown mixture of audio signals.

2. The method of claim 1, wherein defining the processing recipe comprises:
processing the single-track audio input sample using a first processing order of the plurality of source separation processes for separating audio stems to generate a first set of audio stems;
processing the single-track audio input sample using a second processing order of the plurality of source separation processes, different than the first processing order, for separating audio stems to generate a second set of audio stems; and
evaluating the first set of audio stems and the second set of audio stems to determine which of the first processing order and second processing order to include in the processing recipe.

3. The method of claim 1, wherein the processing recipe further comprises post-processing the plurality of audio stems to remove and/or mitigate artefacts introduced by the sequential audio source separation model, wherein the post-processing comprises processing the plurality of audio stems through one or more neural networks trained to remove and/or mitigate artefacts comprising clicks, harmonic distortion, ghosting and/or broadband noise.

4. The method of claim 1, wherein at least one of the first set of one or more separated source signals and the second set of one or more separate source signals comprises a mixture of speech sources and the corresponding one of the first remaining complement signal mixture or second remaining complement signal mixture comprises music and noise.

5. The method of claim 1, wherein the processing recipe further comprises a sequential branching processing order comprising one or more subsequent separation processes;
wherein each subsequent separation process is configured to process an output signal comprising an additional set of one or more separated source signals or an additional remaining complement signal mixture from a previous source separation process and separate a particular source class from the processed output signal.

6. A method comprising:
receiving a single-track audio input sample comprising an unknown mixture of audio signals generated from a plurality of audio sources; and
separating one or more of the audio sources from the single-track audio input sample using a sequential audio source separation model, comprising:
(a) defining a plurality of processing recipes, each processing recipe comprising a plurality of source separation processes having a corresponding order of execution;
(i) wherein each of the plurality of source separation processes is configured to receive an audio input mixture and generate a plurality of audio output stems comprising one or more separated source signals for a corresponding source class and a remaining complement signal mixture; and
(ii) wherein the audio input mixture for a first of the source separation processes in the order of execution comprises the single-track audio input sample, and the audio input mixture for each subsequent source separation process comprises either the one or more separated source signals or the remaining complement signal mixture from a preceding source separation process;
(b) processing the single-track audio input sample using each of the plurality of processing recipes to generate corresponding sets of audio output stems separated from the unknown mixture of audio signals; and
(c) selecting one of the plurality of processing recipes for the sequential audio source separation model by evaluating the sets of audio output stems from the plurality of processing recipes to determine the processing recipe that generates a highest quality set of audio output stems compared to properties of the corresponding source classes.

7. The method of claim 1, wherein the processing recipe comprises post-processing the plurality of audio stems comprising:
combining two of more of the plurality of audio stems having a common source class that were generated by different source separation processes in the processing recipe; and/or
processing one or more of the plurality of audio stems to mitigate artefacts and/or noise introduced by the sequential audio source separation model by applying neural network models trained to clean artefacts on separated audio stems in accordance with the processing recipe.

8. The method of claim 1, wherein separating one or more of the audio sources from the single-track audio input sample using a sequential audio source separation model further comprises:
a user-guided and/or self-iterative process configured to progressively separate sources from the unknown mixture of audio signals, comprising:
(a) selecting audio augmentations and/or audio augmentation parameters to fine-tune the sequential audio source separation model to enable matching source signals in the unknown mixture of audio signals; and
(b) identifying source classes in the unknown mixture of audio signals to identify general separation models for use in the processing recipe.

9. The method of claim 8, wherein the processing recipe comprises a set of source classes and output stems and corresponding source separation models arranged in a hierarchical branching sequence; and
wherein at least one class of sources is separated into a plurality of source class separated stems, and wherein the processing recipe comprises generating a mixture of the plurality of source class separated stems as a source class output.

10. The method of claim 1, further comprising:
training the sequential audio source separation model using the single-track audio input sample by providing the single-track audio input sample to a general source separation model to generate a plurality of initial audio stems corresponding to one or more of the plurality of audio sources and re-training the general source separation model using, at least in part, one or more of the plurality of initial audio stems; and
wherein the general source separation model comprises a plurality of neural network models, each neural network model configured to process a single channel audio input sample and output one or more source separated audio stems comprising a source class and a remaining complement signal mixture.

11. The method of claim 10, wherein training the sequential audio source separation model further comprises training the plurality of neural network models in an order defined by the processing recipe; and
wherein the processing recipe comprises a hierarchical branching sequence wherein each branch comprises one or more of the plurality of neural network models.

12. The method of claim 11, wherein training the sequential audio source separation model further comprises reiteratively training the sequential audio source separation model, based at least in part, on the plurality of audio stems generated from a previous iteration of the sequential audio source separation model.

13. The method of claim 12, wherein training the sequential audio source separation model further comprises:
evaluating the one or more of the plurality of audio stems by determining metrics associated with the source separated audio stems and comparing the metrics to one or more threshold parameters; and
adding one or more source separated audio stems to a training dataset for training the sequential audio source separation model based on the evaluating.

14. The method of claim 1, wherein training further comprises generating a training dataset of artefacts generated by the processing recipe for training one or more neural networks to receive process source separated outputs with artefacts and generate an enhanced output with one or more artefacts mitigated and/or removed in accordance with the processing recipe.

15. A system comprising:
a memory component storing machine-readable instructions; and
a logic device configured to execute the machine-readable instructions to:
(a) separate one or more audio sources from a single-track audio input sample comprising an unknown mixture of audio signals generated from a plurality of audio sources using a sequential audio source separation model, by:
(1) defining a processing recipe comprising a plurality of source separation processes comprising at least a first source separation process configured to process an audio input mixture and output one or more separated source signals and a first remaining complement signal mixture, and a second source separation process configured to process the first remaining complement signal and output one or more separated source signals and a second remaining complement signal mixture; and
(2) processing the single-track audio input sample in accordance with the processing recipe to generate a plurality of audio stems separated from the unknown mixture of audio signals.

16. The system of claim 15, wherein the logic device is further configured to define the processing recipe by:
processing the single-track audio input sample using a first processing order of the plurality of source separation processes for separating audio stems to generate a first set of audio stems;
processing the single-track audio input sample using a second processing order of the plurality of source separation processes, different than the first processing order, for separating audio stems to generate a second set of audio stems; and
evaluating the first set of audio stems and the second set of audio stems to determine which of the first processing order and second processing order to include in the processing recipe.

17. The system of claim 15, wherein the logic device is further configured to define a processing recipe by:
post-processing the plurality of audio stems to remove and/or mitigate artefacts introduced by the sequential audio source separation model; and
wherein the post-processing comprises processing the plurality of audio stems through one or more neural networks trained to remove and/or mitigate artefacts comprising clicks, harmonic distortion, ghosting and/or broadband noise.

18. The system of claim 15, wherein at least one of the first set of one or more separated source signals and the second set of one or more separate source signals comprises a mixture of speech sources and the corresponding one of the first remaining complement signal mixture or second remaining complement signal mixture comprises music and noise.

19. The system of claim 15, wherein the defining the processing recipe further comprises:
a sequential branching processing order comprising one or more subsequent separation processes;
wherein each subsequent separation process is configured to process an output signal comprising an additional set of one or more separated source signals or an additional remaining complement signal mixture from a previous source separation process and
separate a particular source class from the processed output signal.

20. The system of claim 15, wherein the logic device is further configured to:
define a plurality of processing recipes, each processing recipe having a different corresponding order of execution for the plurality of source separation processes;
process the single-track audio input sample using each of the plurality of processing recipes to generate corresponding sets of audio output stems separated from the unknown mixture of audio signals; and
select one of the plurality of processing recipe for the sequential audio source separation model by evaluating the sets of audio output stems from the plurality of processing recipes to determine the processing recipe that generates a highest quality set of audio output stems compared to properties of the corresponding source classes.

* * * * *

UNITED STATES PATENT AND TRADEMARK OFFICE
CERTIFICATE OF CORRECTION

PATENT NO. : 11,763,826 B2
APPLICATION NO. : 17/973492
DATED : September 19, 2023
INVENTOR(S) : Emile de la Rey and Paris Smaragdis It is certified that error appears in the above-identified patent and that said Letters Patent is hereby corrected as shown below:

In the Claims

Claim 14, Column 29, Line 44, Change "networks to receive process source separated outputs with" to "networks to process source separated outputs with"

Signed and Sealed this
Ninth Day of April, 2024

Katherine Kelly Vidal
*Director of the United States Patent and Trademark Office*